(12) United States Patent
Raymond et al.

(10) Patent No.: US 9,482,791 B2
(45) Date of Patent: Nov. 1, 2016

(54) SLANT LENS INTERLACING WITH LINEARLY ARRANGED SETS OF LENSES

(71) Applicant: LUMENCO, LLC, Englewood, CO (US)

(72) Inventors: Mark A. Raymond, Littleton, CO (US); Hector Andres Porras Soto, Lakewood, CO (US)

(73) Assignee: LUMENCO, LLC, Englewood, CO (US)

( * ) Notice: Subject to any disclaimer, the term of this patent is extended or adjusted under 35 U.S.C. 154(b) by 0 days.

(21) Appl. No.: 14/722,992

(22) Filed: May 27, 2015

(65) Prior Publication Data

US 2015/0260883 A1 Sep. 17, 2015

Related U.S. Application Data

(63) Continuation of application No. 14/282,271, filed on May 20, 2014, now Pat. No. 9,052,518, which is a continuation-in-part of application No. 14/088,519, filed on Nov. 25, 2013.

(60) Provisional application No. 61/797,145, filed on Nov. 30, 2012.

(51) Int. Cl.
| | |
|---|---|
| *G06K 15/00* | (2006.01) |
| *G02B 3/00* | (2006.01) |
| *G02B 27/22* | (2006.01) |

(52) U.S. Cl.
CPC .............. *G02B 3/0037* (2013.01); *G02B 3/005* (2013.01); *G02B 27/2214* (2013.01)

(58) Field of Classification Search
None
See application file for complete search history.

(56) References Cited

U.S. PATENT DOCUMENTS

| | | |
|---|---|---|
| 4,023,904 A | 5/1977 | Sheets |
| 6,064,424 A | 5/2000 | Van Berkel et al. |
| 7,359,120 B1 | 4/2008 | Raymond et al. |

(Continued)

FOREIGN PATENT DOCUMENTS

| | | |
|---|---|---|
| JP | 2006-163278 | 6/2006 |
| JP | 4357814 | 11/2009 |

(Continued)

OTHER PUBLICATIONS

PCT International Search Report and Written Opinion for PCT/US2013/071599 mailed on Mar. 13, 2014.

(Continued)

*Primary Examiner* — Ted Barnes
(74) *Attorney, Agent, or Firm* — Marsh Fischmann & Breyfogle LLP; Kent A. Lembke

(57) ABSTRACT

An optical product that includes a transparent lens sheet, which has a first side with a plurality of side-by-side sets of linearly arranged lenses. Each of the sets of lenses is at a slant angle in the range of 10 to 46 degrees from a vertical or a horizontal axis of the lens sheet. The product includes an image layer that includes pixels from a number of digital images. The pixels are arranged in a pattern of pixel locations providing non-orthogonal interlacing of the digital images relative to each of the sets of the linearly arranged lenses. The pattern of pixel locations aligns a number of the pixels from each of the digital images to be parallel to a line extending through a center of the linearly arranged lenses in each set. Each of the linearly arranged lenses may have a round base, a hexagonal base, or a square base.

24 Claims, 17 Drawing Sheets

(56) References Cited

U.S. PATENT DOCUMENTS

| | | | |
|---|---|---|---|
| 7,457,038 B2 | 11/2008 | Dolgoff | |
| 2004/0157011 A1 | 8/2004 | Raymond et al. | |
| 2004/0174472 A1* | 9/2004 | Park | H04N 13/0404 349/95 |
| 2005/0259323 A1* | 11/2005 | Fukushima | G02B 27/2214 359/462 |
| 2006/0227427 A1* | 10/2006 | Dolgoff | G02B 27/2214 359/619 |
| 2006/0285214 A1* | 12/2006 | Haga | B29D 11/00278 359/619 |
| 2007/0058260 A1* | 3/2007 | Steenblik | G02B 27/2214 359/626 |
| 2007/0206084 A1* | 9/2007 | Suzuki | B41J 3/407 347/105 |
| 2008/0037131 A1* | 2/2008 | Steenblik | B44F 1/10 359/619 |
| 2008/0112056 A1 | 5/2008 | Raymond et al. | |
| 2009/0052027 A1 | 2/2009 | Yamada et al. | |
| 2009/0073556 A1 | 3/2009 | Bent-Gourley | |
| 2009/0122412 A1* | 5/2009 | Steenblik | G02B 27/2214 359/626 |
| 2009/0153652 A1* | 6/2009 | Barenbrug | H04N 13/0018 348/54 |
| 2009/0213210 A1 | 8/2009 | Conley | |
| 2009/0262418 A1 | 10/2009 | Yun et al. | |
| 2010/0091206 A1 | 4/2010 | Chapman | |
| 2010/0097545 A1 | 4/2010 | Robinson et al. | |
| 2010/0118218 A1* | 5/2010 | Eichenlaub | G02B 27/2214 349/15 |
| 2010/0142057 A1* | 6/2010 | Nagata | G02B 3/0068 359/622 |
| 2010/0309298 A1 | 12/2010 | Muijs et al. | |
| 2011/0102423 A1 | 5/2011 | Nam et al. | |
| 2011/0248994 A1* | 10/2011 | Van Der Horst | H04N 13/0404 345/419 |
| 2012/0012741 A1* | 1/2012 | Vasylyev | G01J 1/0407 250/237 R |
| 2012/0062559 A1 | 3/2012 | Yun et al. | |
| 2012/0087013 A1* | 4/2012 | Liu | B29D 11/00278 359/628 |
| 2012/0212486 A1 | 8/2012 | Van Der Horst et al. | |
| 2012/0218641 A1* | 8/2012 | Kikuchi | G02B 3/0056 359/619 |
| 2012/0287447 A1* | 11/2012 | Zomet | G02B 3/005 358/1.6 |
| 2013/0057159 A1 | 3/2013 | Pijlman et al. | |
| 2013/0135545 A1 | 5/2013 | Jung et al. | |
| 2013/0155377 A1 | 6/2013 | Huang | |
| 2013/0163078 A1 | 6/2013 | Saito | |
| 2013/0187910 A1 | 7/2013 | Raymond et al. | |
| 2013/0194398 A1 | 8/2013 | Saito | |
| 2013/0194521 A1 | 8/2013 | Whangbo et al. | |
| 2013/0208356 A1 | 8/2013 | Saito | |
| 2013/0208357 A1* | 8/2013 | Saito | G03B 35/18 359/463 |
| 2013/0265640 A1 | 10/2013 | Saito | |
| 2013/0278736 A1 | 10/2013 | Saito | |
| 2013/0321595 A1 | 12/2013 | Saishu | |
| 2014/0029094 A1 | 1/2014 | Kroon et al. | |
| 2014/0063213 A1 | 3/2014 | Tsuchihashi et al. | |
| 2014/0063611 A1 | 3/2014 | Raymond et al. | |
| 2014/0111854 A1 | 4/2014 | Kroon et al. | |
| 2014/0118226 A1 | 5/2014 | Gollier | |

FOREIGN PATENT DOCUMENTS

| | | |
|---|---|---|
| KR | 10-2008-0029401 | 4/2008 |
| KR | 10-2011-0024970 | 3/2011 |
| WO | 2012046654 A1 | 4/2012 |

OTHER PUBLICATIONS

English Translation of KR 10-2008-0029401.
English Translation of KR 10-2011-024970.
English Translation of Abstract for JP 4357814.
English Translation of Abstract for JP 2006-163278.
PCT International Search Report and Written Opinion for PCT/US2014/38828, dated Sep. 22, 2014.
PCT International Search Report and Written Opinion for PCT/US2015/030376 mailed on Sep. 16, 2015.
EP Extended Search Report for PCT/US2013/071599, mailed on Jun. 8, 2016.

* cited by examiner

SLANT LENS INTERLACING WITH LINEARLY ARRANGED SETS OF LENSES

CROSS-REFERENCE TO RELATED APPLICATIONS

This application is a continuation of U.S. patent application Ser. No. 14/282,271, filed May 20, 2014, which is a continuation-in-part of U.S. patent application Ser. No. 14/088,519, filed Nov. 25, 2013, which claims the benefit of U.S. Provisional Application No. 61/797,145, filed Nov. 30, 2012, all of which are incorporated herein by reference in their entireties.

BACKGROUND

1. Field of the Description

This description is generally directed toward methods of interlacing images for use in printing images viewable through a lenticular lens array or lens sheet, and, more particularly, to methods of interlacing to provide an increased amount of information (e.g., interlaced images or frames) underneath each lenticule to facilitate use of thinner lens sheets.

2. Relevant Background

Elaborate graphics or visual displays can be produced through the use of sheets of lenticular lens arrays as these arrays of lenses can be combined with printed interlaced images to provide three-dimensional (3D) and animated imagery. For example, lenticular lens material is used in the packaging industry for creating promotional material with appealing graphics and typically involves producing a sheet of lenticular lens material and adhesively attaching the lenticular lens material to a separately produced object for display. The production of lenticular lenses is well known and described in detail in a number of U.S. patents, including U.S. Pat. No. 5,967,032 to Bravenec et al. and U.S. Pat. No. 6,781,761 to Raymond.

In general, the production process includes selecting segments from visual images to create a desired visual effect, slicing each segment into a predefined number of slices or elements (such as 10 to 30 or more slices per segment), and interlacing the segments and their slices (i.e., planning the layout of the numerous images). Lenticular lenses or lens sheets are then fabricated according to the number of slices or the interlacing may be performed to suit the lens sheets, e.g., to suit a particular lenticules or lenses per inch (LPI) of the lens sheet. The lenticular lenses generally include a transparent web that has a flat side or layer and a side with optical ridges and grooves formed by linear or elongated lenticules (i.e., lenses) arranged side-by-side with the lenticules or optical ridges extending parallel to each other over the length of the transparent web. To provide the unique visual effects, ink (e.g., four color ink) is applied to or printed directly on the flat side of the transparent web to form a thin ink layer (or a printed image is applied with adhesive to the back or planar side of the transparent web), which is then viewable through the transparent web of optical ridges.

Each lenticule or lens of the lenticular layer is paired or mapped to a set or number of the interlaced image slices or elements. Generally, only one of the slices is visible through the lenticule at a time based on the position of the lenticule relative to a viewer's eye. In other words, the animation, 3D, or other graphic effect is achieved by moving the lenticule or the viewer's position to sequentially view each of the interlaced image slices under the lenticule and allow a viewer to see each segment of the image by combining the slices viewed from all the lenticules.

In producing conventional lenticular lens material, it is desirable to use as little material as possible, i.e., to produce effective lenticules or lenticular lens arrays with as thin web material as possible. Decreasing lens thickness is also desirable to facilitate fabrication using techniques such as web printing that are very difficult or impractical with thicker lens materials. Thin lenticular lens material is desired to save on material costs and to provide a relatively flexible lens material or substrate that can be easily applied to products and product containers, such as in a label that can be attached to a box or to a bottle as part of a wraparound label or on a cup to provide desirable visual effects. To make lenticular lens materials thinner, the whole structure must be properly scaled downward together. In other words, the lenticules and the printed interlaced image must be shrunk or made smaller together to allow proper mapping of the image slices to the lenticules.

However, such shrinking of the lenticules has proven very difficult with limitations associated with printing the interlaced images often preventing the lens layer or web from being made very thin. As noted above, all the interlaced slices for each segment are placed underneath a single lenticule such that numerous slices have to be printed with very little width to be mapped to the lenticules width or pitch. With coarser lens arrays (i.e., with lower the frequency or LPI), the printing can be accomplished more easily and mapping to lenticules of the image slices achieved more accurately. However, coarser lens arrays with frequencies of 10 to 30 LPI tend to be very thick because general physics or optical rules for focusing with conventional lenticular material require that more lens thickness or more lens material be provided to achieve effective focusing. For example, a 15 LPI lenticular lens array with a fairly common viewing angle (such as a 22-degree viewing angle) may be mapped to an interlaced image that is printed or provided directly behind the lenticular lens array, with each of the lenticules in the lens array being mapped to or paired with all image slices of a paired segment of the interlaced image. If the lens array is formed from acrylic, the lens array would need to be about ⅜-inch thick to enable the lenticules to properly focus on the paired image slices.

Traditionally, lenticular printing has been a multi-step process that includes creating a lenticular image from at least two images and combining it with a lenticular lens. The lenticular printing process can be used to create various frames of animation for a motion effect, can be used for offsetting the various layers at different increments for a 3D effect, or can be used simply to show a set of alternate images that may appear to transform into each other. Once the various images are collected, they are flattened into individual, different frame files, and, then, the frame files are digitally combined into a single final file for use in printing an interlaced image. The digital combining process is often called "interlacing."

Once the combined or interlaced file is generated, it can be used to print an interlaced image directly to the back (or smooth/planar) side of the lenticular lens sheet. In other applications, the interlaced image may be printed onto a substrate (e.g., a synthetic paper or the like), which is then laminated onto the lens (e.g., a transparent adhesive may be used to attach the substrate with the printed interlaced image onto the lenticular lens sheet). When printing to the backside of the lens sheet, the registration of the thin slices or elongated interlaced images to the lenses is important during the lithographic or screen printing process to avoid or at least limit ghosting or other effects that produce poor imagery.

With traditional lenticular interlacing, each image is arranged or sliced into strips, which are then interlaced with one or more similarly arranged or sliced images such as by splicing or interlacing. The end result is that a person's single eye looking at the printed interlaced image through the lenticular lens array (or lens sheet) sees a single whole image while a person's two eyes may see different images (e.g., right and left-eye images), which provides a desired autostereoscopic or 3D perception.

The process of creating strips of information from graphics or images and then scrambling them into a single image for printing underneath a lens sheet can be problematic. One significant problem is that there is a limitation on the amount of information (e.g., pixels) that can be placed underneath each lenticule or elongated lens in the lens sheet. For example, a lens or lenticule has a particular size (e.g., a width set by the LPI of the lens sheet or lens array), and the printer used to provide the printed interlaced image may have a particular resolution (e.g., dots per inch (DPI)). Hence, these limitations or parameters of a lenticular product or assembly (e.g., a security stamp or security thread for a bank note or piece of currency) define the maximum number of frames or images that can be interlaced and then printed on a lens sheet by the equation: Maximum number of frames=DPI/LPI.

FIG. 1 illustrates a cross-sectional view (or end view) of a very simple lenticular device or assembly 100 that is useful for discussing these limitations associated with traditional lenticular printing and interlacing. As shown, the assembly 100 includes a single lenticule or elongated lens 110 with a planar side or base 112 of a particular width, $L_W$ (lenticule size as defined by the LPI of a sheet including lens/lenticule 110). An ink layer or printed interlaced image 120 is provided directly onto the back side or base 112 of the lenticule 110, and, in this example, the interlaced image 120 includes five image slices 124 (e.g., long, thin portions of five different images/frames) that would extend the length of the lenticule 110 in a parallel manner (parallel to each other and to the longitudinal axis of the lenticule/lens 110).

In the assembly or device 100, the lens size, $L_W$, and pixel size is such that the lens 110 can only work well with a maximum of five interlaces or image slices 124 (e.g., five pixels with each pixel being associated with one of the five interlaced frames/images). These are shown to be exactly aligned with the lens 110 but may, in practice, be somewhat offset while still being parallel to the longitudinal axis of the lens 110 and still achieve a desirable image when viewed through the lens 110. The interlacing is orthogonal in that the five pixels extend orthogonally across the lens 110 relative to its longitudinal axes (e.g., the elongated slices of the image extend parallel to the longitudinal axis of the lens 110 such that side-by-side pixels associated with these slices/interlaces extend across the lens width, $L_W$).

However, in order to achieve a 3D effect with lenticular sheets, the minimum number of frames needed is six or more images/frames. This means, for example, that for a 1200 DPI output device (e.g., printer) the lenticular lenses must have a width associated with a 200 LPI or higher (where LPI=DPI/Number of frames or, in this case, 200 LPI=1200 DPI/6 frames). This relationship between resolution of the output device, the number of frames needed to produce 3D, and the lens size creates a significant restriction to developing thinner lenticules and corresponding thinner lenticular products (such as security threads or stamps for currency or bank notes). However, it should be understood that the limitation is not the ability to fabricate thinner lens sheets because lens sheets that are very thin can readily be produced with presently available technology. Instead, the restriction or challenge to providing thin lens sheets comes from the high resolution that would be required, and, therefore, the limitation of the number of frames that can be printed on or underneath smaller sized lenses (e.g., lenses with smaller widths or $L_W$).

FIG. 2 illustrates a top perspective view of a lenticular product or assembly 200 that may use conventional or traditional interlacing. As shown, the assembly 200 includes a lens sheet or lens array 210 that may be formed of a thickness of plastic or other transparent material. On a top or exposed side, the lens sheet 210 is grooved or shaped to provide a number of lenticules or elongated lenses 214 that extend in a parallel manner from one end to the other of the sheet 210. As is common, the lenticules 214 extend "vertically" in the array or sheet 210 or with their longitudinal axes being orthogonal to the top and bottom edges 211, 213 of the sheet 210 (or being parallel to left and right side edges). Each lenticule or lens 214 has a size or width, $L_W$, that is defined by the LPI of the lens sheet 210.

In the lenticular assembly 200, an ink layer 220 is printed directly upon a planar back side or bottom side 216 of the lens sheet 210 (or may be provided on a substrate that is laminated onto the lens sheet 210). The ink layer 220 is printed to provide a number of interlaced images or slices 224 underneath each lenticule 214 such as to provide a 3D effect. As shown, the interlaced image of ink layer 220 has five slices 224 associated with five different frames underneath each lenticule 214, with different slices of the same frame being provided under different lenticules 214 in the sheet 210. In this case, the image file for printed ink layer 220 was created with five pixels to match the size, $L_W$, of each lens 214.

Lenticular devices may also use lenses or lenticules that are provided in a sheet or array with an angular arrangement, e.g., not parallel or orthogonal to edges of the sheet/array. FIG. 3 illustrates a conventional slant lens lenticular device or assembly 300 in which a lens or lenticular sheet 310 is combined with an interlaced image provided in an ink layer 320. The lens sheet 310 includes a number of lenticules or lenses 314 on a top or exposed side, and the lenticules 314 extend parallel to each other but, in this lens sheet 310, the lenticules 314 are not arranged vertically or horizontally. In other words, the lenticules or lenses 314 are "slanted" with their longitudinal axes, $Axis_{Long}$, as shown at 315 arranged to each be at a particular angle, θ, relative to a side edge 311 of the lens sheet 310, with the slant angle, θ, being less than 90 degrees (not orthogonal) such as 20 to 60 degrees or the like. Again, each lens 310 has a size or width, $L_W$, set by the LPI of the sheet 310 that may limit the number of image slices that may be placed underneath each of the lenses 314 with conventional interlacing techniques.

The lenticular assembly 300 further includes an ink layer 320 providing a printed interlaced image with a number (here five) of slices 324 provided under each lens 314. In other words, instead of having the interlaces or slices 324 provided with "vertical" strips that are spliced together, the ink layer 320 provides the image with slanted strips 324 matching the slant angle, θ, of the lenses 314. Hence, the interlacing for slant lens sheets such as sheet 310 has traditionally involved arranging the elongated slices of a number of images to extend parallel to each other and also to the longitudinal axis, $Axis_{Long}$, as shown at 315 of the lenses 314. Hence, the interlacing of the device 300 again is to match the size of the lenses 314 with five pixels arranged orthogonally to the longitudinal axis, $Axis_{Long}$ (e.g., to extend across the width, $L_W$, of the lens 314). As can be seen, the use of slant lens does not increase the amount of information provided under the lens array when traditional interlacing is used to generate the interlaced image.

There remains a need for methods for providing an interlaced image (i.e., interlacing methods) that allow additional information to be provided under the lenses or lenticules of a sheet of lenticular material (or a lens sheet). Preferably, such interlacing methods would be useful with existing and to-be-built output devices (e.g., printers) to allow lenticular products to be provided with desirable imagery (e.g., 3D imagery) with much lower thicknesses of lenticular material or lens sheets, e.g., to support use of lenticular assemblies or elements as security threads, stamps, and the like in bank notes, currency, and other items.

SUMMARY

The inventors recognized that thinner lenses and, therefore, thinner lenticular material could be used to display 3D and other imagery by printing more information under each lens or lenticule. To this end, an interlacing method was developed for use with angled lenticules or slant lenses that differs from traditional interlacing, in part, by utilizing non-orthogonal interlacing.

Interlacing of images into a combined image file (or interlaced print file for controlling an output device or printer) involves arranging a set of pixels in a line or column that is transverse but non-orthogonal to the longitudinal axis of a slant lens or slanted lenticule. Each of these pixels is associated with a different frame/image, e.g., 6 or more frames are typically used in each interlaced image, with one being visible through the lens or lenticule at a time by a viewer. The new slant lens interlacing method does not involve slicing each frame and then splicing these slices together. Instead, individual pixels from each frame are combined within a digital print file in a unique pattern to provide the non-orthogonal interlacing described herein (e.g., the new interlacing may be considered "matrix interlacing" or "angular-offset interlacing").

By utilizing non-orthogonal interlacing or matrix interlacing to create a print file that is used to control an output device/printer, a significantly larger amount of information may be presented under each slant lens or slanted lenticule. For example, the traditional interlacing example provided in FIG. 3 was able to provide five pixels under each lenticule while the new interlacing process is able to provide 10 to 14 pixels under the same-sized lenticule.

More particularly, a method is provided for generating an interlaced print file for use in printing on or for a lens sheet with slanted lenticules. The method includes providing digital files for a set of frames for interlacing and inputting a slant angle for lenticules of the lens sheet. The method further includes interlacing the frames to form an interlaced print file by positioning a number of pixels from each of the frames in the print file based on a pattern of pixel locations provided in a predefined pixel matrix. The pixel matrix is configured to map the plurality of pixels to the lenticules of the lens sheet based on the slant angle. To this end, interlacing of the frames is non-orthogonal to a longitudinal axis of each of the lenticules (i.e., not directly across the width of each lens as in traditional slant lens interlacing).

In some implementations of the method, each set of interlaced ones of the pixels associated with the set of frames is aligned in a column or in a row of the pixel matrix (e.g., interlacing is along a vertical line/column (or horizontal line/row) while the lenses are slanted from vertical (or from horizontal)). The pixel matrix may be made up of a number of spaced apart sets of the pixels from each of the frames with the pixel locations for each of the spaced apart sets being arranged linearly at an offset angle of about the slant angle. In such cases, the slant angle may be in the range of 14 to 15 degrees, in the range of 18 to 19 degrees, in the range of 26 to 27 degrees, or in the range of 44 to 46 degrees. The number of frames in the set of frames may vary with some embodiments interlacing 6 frames, 9 frames, or 16 frames to create a desired effect (e.g., 3D imagery visible through a lens sheet). In these cases, the pixel matrix comprises a repeating 6 by 6 pixel matrix, a 9 by 9 pixel matrix, or a 16 by 16 pixel matrix.

According to another aspect of the present description, a lenticular product is provided that includes a transparent lens sheet and an image or ink layer. The lens sheet includes a first side having a plurality of side-by-side, elongated lenses each at an angle in the range of 10 to 46 degrees from a vertical or a horizontal axis of the lens sheet. The ink layer is proximate to a second side of the lens sheet opposite the first side (e.g., is printed onto this planar side or is laminated to the side with transparent adhesive). The ink layer includes pixels from a plurality of digital images, with the pixels being arranged in a pattern of pixel locations providing non-orthogonal interlacing of the digital images relative to each of the elongated lenses. The pattern of pixel locations can be adapted to align a number of the pixels from each of the digital images to be parallel to a longitudinal axis of an adjacent one of the elongated lenses such that pixels of only one digital image are viewed at a time through the lens sheet's lenses.

In some cases, the lens sheet has a thickness in the range of 10 to 2500 microns and the elongated lenses are provided on the first side at 75 to 1500 LPI (which defines the width or size of each lens). The plurality of digital images may include a number of images selected from the range of 6 images to 16 images, and, further, the non-orthogonal interlacing may be provided by sets of the pixels equal in number to the number of images including at least one pixel from each of the plurality of digital images. It may be useful for the sets of the pixels that are providing the non-orthogonal interlacing to be aligned in a row or in a column of the pattern of pixel locations.

In particular implementations of the lenticular product, the angle of the elongated lenses is 14.04 degrees, 18.435 degrees, 26.57 degrees, or 45 degrees. The plurality of digital images can be selected such that the plurality of pixels in the ink layer produces a 3D image when viewed through the elongated lenses of the lens sheet. A transparent adhesive may be provided to attach the ink layer that is printed on a substrate onto the lens sheet or to attach the lens sheet and ink layer to a substrate. The lenticular product may be nearly any object such as a piece of paper or polymer currency (or bank note) with a security thread or stamp (e.g., a 3D image is visible with the security thread or stamp using slant lenses combined with the interlacing taught herein).

According to yet another aspect of the present description, a method is provided for fabricating a lenticular product. The method includes providing a pixel matrix defining a plurality of pixel locations for pixels of a number of images. The pixel locations are adapted to position the pixels associated with each of the images in a line parallel to longitudinal axes of lenticules provided at a slant angle in a lens sheet. The pixel locations of the matrix are further adapted to interlace sets of the pixels associated with differing ones of the images along an interlace line that is transverse to and non-orthogonal to the longitudinal axes of the lenticules.

The method further includes generating a digital print file by interlacing the images according to the pixel matrix by placing the pixels of the images into the pixel locations identified in the pixel matrix. Then, with the digital print file, the method includes operating an output device to print an interlaced image onto a planar back side of the lens sheet or onto a substrate for later application to the back side of the lens sheet. In some preferred embodiments, the slant angle is 14.04 degrees, 18.435 degrees, 26.57 degrees, or 45 degrees. In these and other embodiments, the lenticules can be provided on the lens sheet at an LPI of at least 75 LPI, and the lens sheet may have a thickness of 10 to 2500 microns.

According to a further aspect of the present description, an optical product or assembly is provided that includes a transparent lens sheet. This sheet or lens material has a first side with a plurality of side-by-side sets of linearly arranged lenses. Each set is at a slant angle in the range of 10 to 46 degrees from a vertical or a horizontal axis of the lens sheet. The product or assembly further includes an ink or image layer, proximate to a second side of the lens sheet opposite the first side, that includes pixels from a plurality of digital images or frames. The pixels are arranged in a pattern of pixel locations providing non-orthogonal interlacing of the digital images relative to each of the sets of the linearly arranged lenses. The pattern of pixel locations is adapted to align a number of the pixels from each of the digital images to be parallel to a line extending through a center of the linearly arranged lenses in an adjacent one of the sets of the linearly arranged lenses.

In some preferred embodiments, each of the linearly arranged lenses has a round base while in others each of the linearly arranged lenses has a hexagonal base or a square base. In some cases, the lens sheet has a thickness in the range of 10 to 2500 microns and the sets of the linearly arranged lenses are provided on the first side at 75 to 1500 LPI. Further, each of the linearly arranged lenses has a size parameter matching an LPI of the sets of the linearly arranged lenses (e.g., a width of a square or hexagonal lens or a diameter of a round lens may be chosen to match the LPI (e.g., a corresponding width of a lenticule provided at such an LPI)).

In many cases, the plurality of digital images includes a number of images selected from the range of 5 images to 16 images, and the non-orthogonal interlacing is provided by sets of the pixels equal in number to the number of images including at least one pixel from each of the plurality of digital images. In these cases, the sets of the pixels providing the non-orthogonal interlacing are aligned in a row or in a column of the pattern of pixel locations. Further, it is sometimes useful for the slant angle to be within a range of 14 to 15 degrees, a range of 18 to 19 degrees, a range of 26 to 27 degrees, or a range of 44 to 46 or more specifically for the slant angle to be 14.04 degrees, 18.435 degrees, 26.57 degrees, or 45 degrees.

DETAILED DESCRIPTION

Briefly, the present description is directed toward a method for lenticular interlacing for use with lens sheets or lenticular material having slanted lenticules or slant lenses (slant lens interlacing, matrix interlacing, and non-orthogonal interlacing, interchangeably). The interlacing differs from traditional interlacing because it does not simply involve providing slices of an image (or pixels associated with each) orthogonally or directly across the width of the lens (or with slices arranged in parallel at an angle matching the lens). Instead, each frame or image is first considered as a set of pixels, and pixels from each frame or image are arranged in a matrix or pattern such that a set of pixels made up of a pixel from each frame is arranged transverse but non-orthogonally under the lenticule. In this way, a much larger number of pixels for a particular output device resolution (DPI) can be provided under a lenticule for selective viewing. As a result, the non-orthogonal interlacing supports use of a thinner lens sheet to achieve a particular imagery or supports a much better quality imagery to be viewed with a predefined lens sheet thickness.

Figure 1:
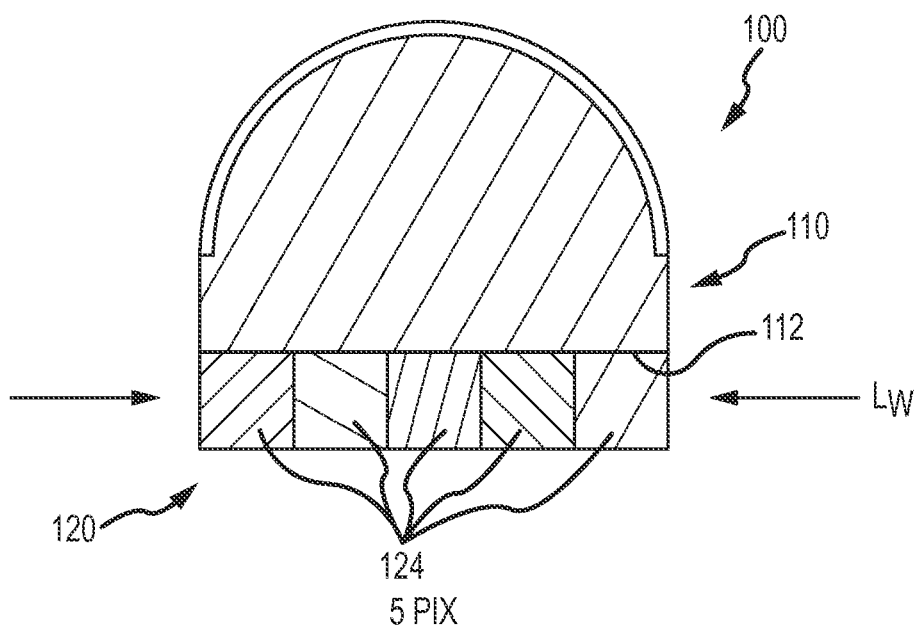
FIG. 1 is a cross-section of a simple lenticular device or assembly illustrating conventional interlacing.
Figure 2:
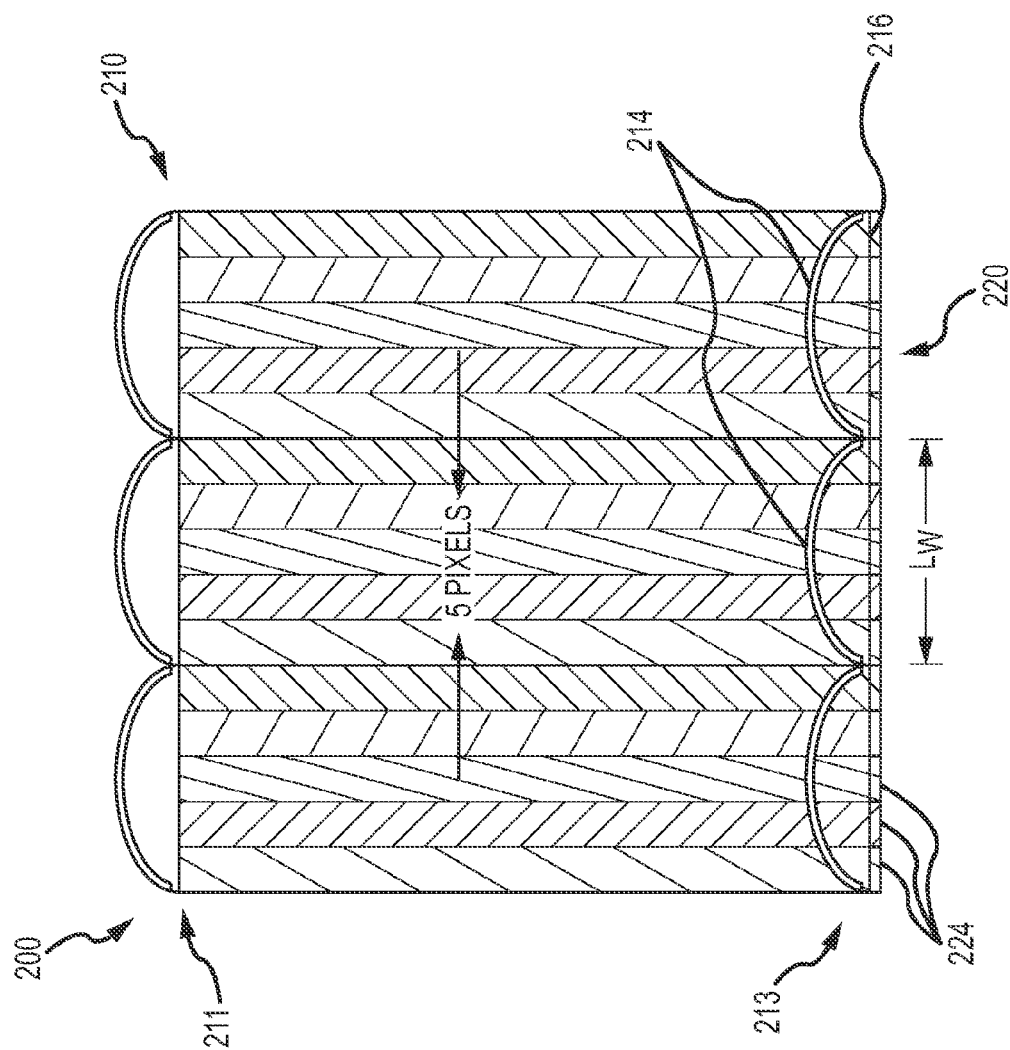
FIG. 2 illustrates a top perspective view of a conventional lenticular device or product.
Figure 3:
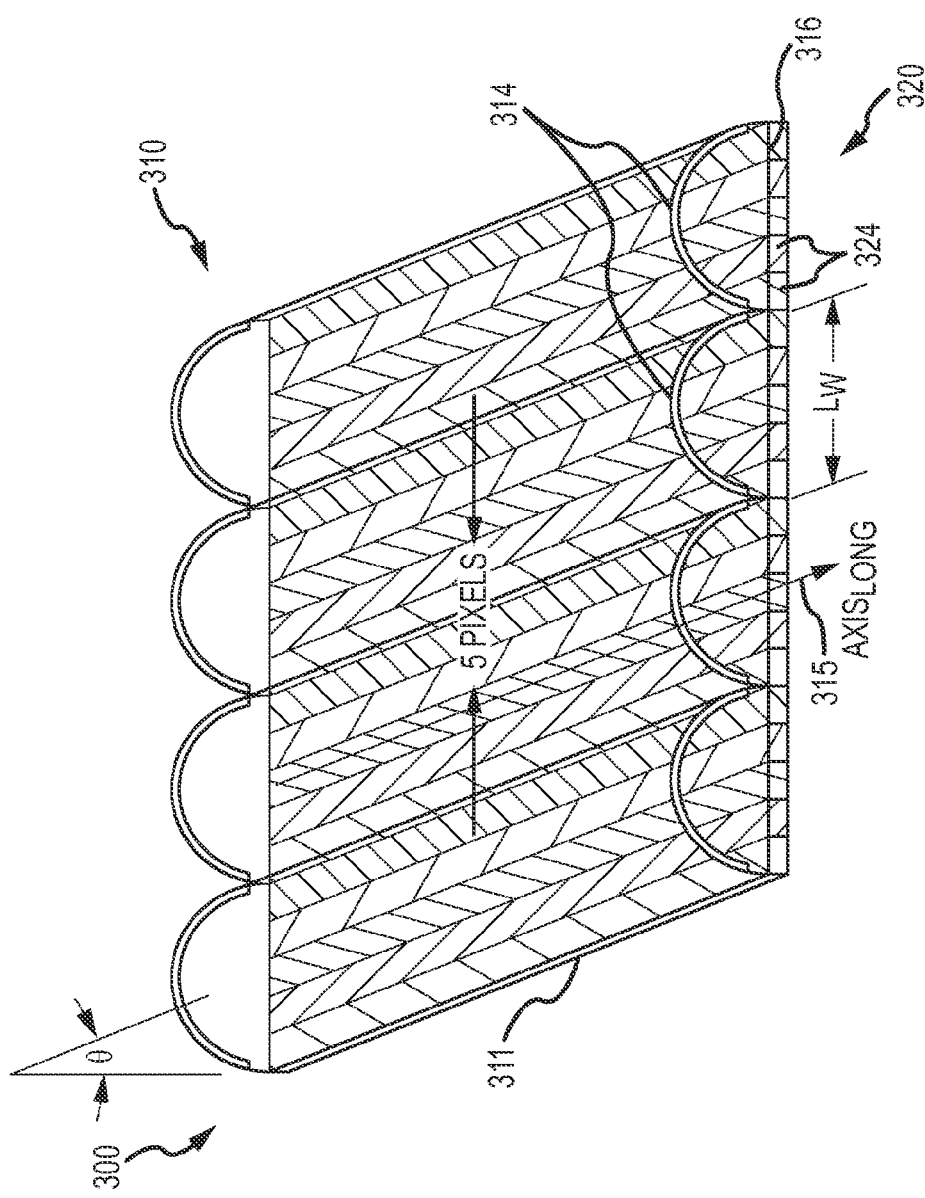
FIG. 3 illustrates a top perspective view similar to FIG. 2 showing a second conventional lenticular device or product that uses slant lens with conventional orthogonal interlacing.

In FIG. 3, the image provided in the print layer 320 with interlaces/slices 324 is basically the same as the image provided with print layer 220 in FIG. 2. Particularly, the interlaces/slices 324 are arranged with the same angle as the lenses 314, and the amount of information or frames is also limited by the same relationship between the lenses, DPI, and resolution. In order to break this relationship (i.e., frames multiplied by LPI equals DPI) that limits the amount of information or, in this case, pixels that can be printed under the lenses, the inventors recognized that it would be useful to use a completely different pixel array (or pixel map) for interlacing the images/frames under the slant lens.

Figure 4:
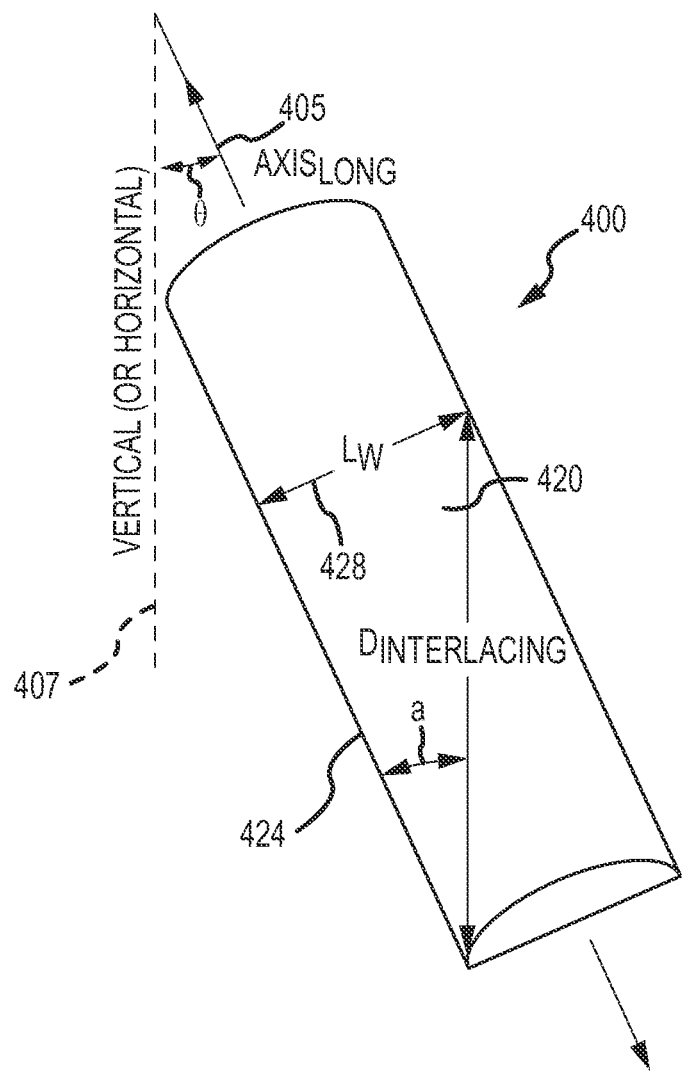
FIG. 4 is a diagram illustrating use of new non-orthogonal interlacing (matrix interlacing) to take advantage of a greater amount of printing space under a slant lens or slanted lenticule.

FIG. 4 provides a diagram of a single slant lens or slanted lenticule 400 for which it may be desirable to generate a print file for use in printing an interlaced image. The lenticule 400 is shown to be angled (not simply vertical or horizontal on a surface of a lens sheet) with its longitudinal axis, $Axis_{Long}$, as shown at 405 being at an offset or slant angle, θ, to vertical (or horizontal) as shown at 407 (e.g., a side of a lens sheet or the like). Traditional interlacing would be provided with the slant lens 400 by arranging slices parallel to the axis 405 of the lens 400, which would provide a number of pixels orthogonally across the lens 400 or to fill the dimension, $L_W$ (e.g., the width or size of the lens 400 as defined by its LPI). In contrast, the non-orthogonal interlacing of the present description calls for providing a number of interlaced pixels transverse to the longitudinal axis 405 but not orthogonally, i.e., along the line 420 which has a length or dimension, $D_{Interlacing}$, that is much larger than the width, $L_W$, of the lens 400.

In a slant lens 400 as shown in FIG. 4, there is a triangle with properties that can be used to fit more information under the lens 400. The slant lens 400 is defined by a size, $L_W$, as shown by line 428, which is given by: $L_W=1/LPI$. If, for example, a lens sheet is fabricated at 75 LPI, the size, $L_W$, of each lenticule or lens 400 would be ⅟₇₅ inches or 0.0133 inches. However, the vertical distance, $D_{Interlacing}$, as shown with line 420 (or the hypotenuse of the triangle) is larger than the lens size, $L_W$, and this magnitude of this vertical distance, $D_{Interlacing}$, is defined or given by the triangle that is formed and shown in FIG. 4. Specifically, the triangle formed by or made up of a segment/length of the lens 400 as shown by line 424, the width of the lens 400 as shown by line 428 (which is orthogonal to the longitudinal axis 405 of the lens 400), and the vertical distance, $D_{Interlacing}$, as shown by line 420 contains an angle, a, (between lines 420 and 424). This triangle may be defined by the equation: $D_{Interlacing}=L_W/\sin(a)$. In turn, this equation may be rewritten as: $D_{Interlacing}=(1/LPI)/\sin(a)$.

Using specific values may be illustrative at this point in the description. For example, a lenticular array may be formed at 75 LPI, which provides a lens size or width, $L_W$, of 0.0133 inches. If the angle, a, is taken to be 25 degrees (as one useful, but non-limiting example), the vertical distance, $D_{Interlacing}$, is 0.0315 inches, which is nearly three times the lens width, $L_W$. Hence, one can readily appreciate why it is desirable to provide the interlacing or interlaced pixels along the line 420 rather than along the orthogonal or line 428. Using the larger distance, $D_{Interlacing}$, to arrange the pixels in a vertical position with a slanted lens 400 provides much more room or printing space than going with the traditional interlacing across the lens 400.

However, it was also understood by the inventors that traditional interlacing techniques could not be used to provide information under the line 420 to allow viewing of a quality image such as 3D imagery with 6 or more interlaced frames/images. Instead, FIG. 5 illustrates a diagram 500 comparing traditional interlacing with a new non-orthogonal or matrix interlacing process to place pixels or information under this vertical distance or the hypotenuse of the triangle discussed with reference to FIG. 4.

As shown, a slant lens 510 is provided as may be included in a lens sheet or piece of lenticular material in a lenticular device/assembly (such as a security thread or stamp for currency or bank notes or other items). Traditional interlacing is shown with the set of pixels 520 extending side-by-side orthogonally across the lens 510. The size, $L_W$, of the lens 510 limits the number of pixels 520 with five pixels being shown in this example.

In contrast, though, non-orthogonal or matrix interlacing is shown with the set of pixels 530 extending transverse but non-orthogonally across the longitudinal axis of the lens 510. Specifically, the pixel set (or interlace set) 530 is made up of a number of side-by-side pixels 531, 532, 533, 534, 535, 536, 537, 538, 539, 540, 541 from a like number of frames or images being interlaced/combined to produce imagery viewable via lens 510. In this example, the pixels of each of the sets 520 and 530 are of the same size but there is room along the vertical or hypotenuse for a greater number of such pixels (e.g., 5 pixels in the traditional interlacing set 520 compared with 12 pixels in the non-orthogonal interlacing set 530, which is more than a doubling of the number of pixels or amount of information that can be printed under or provided under the slant lens 510). The dashed box 590 is useful for highlighting or showing an exemplary lens focus for the lens 510, which shows that with the new interlacing 530 (and a number of other interlacing sets similar to set 530) the lens 510 is still focusing on pixels 539, 549, 559, 569 that belong to or are associated with a single frame or image.

Figure 5:
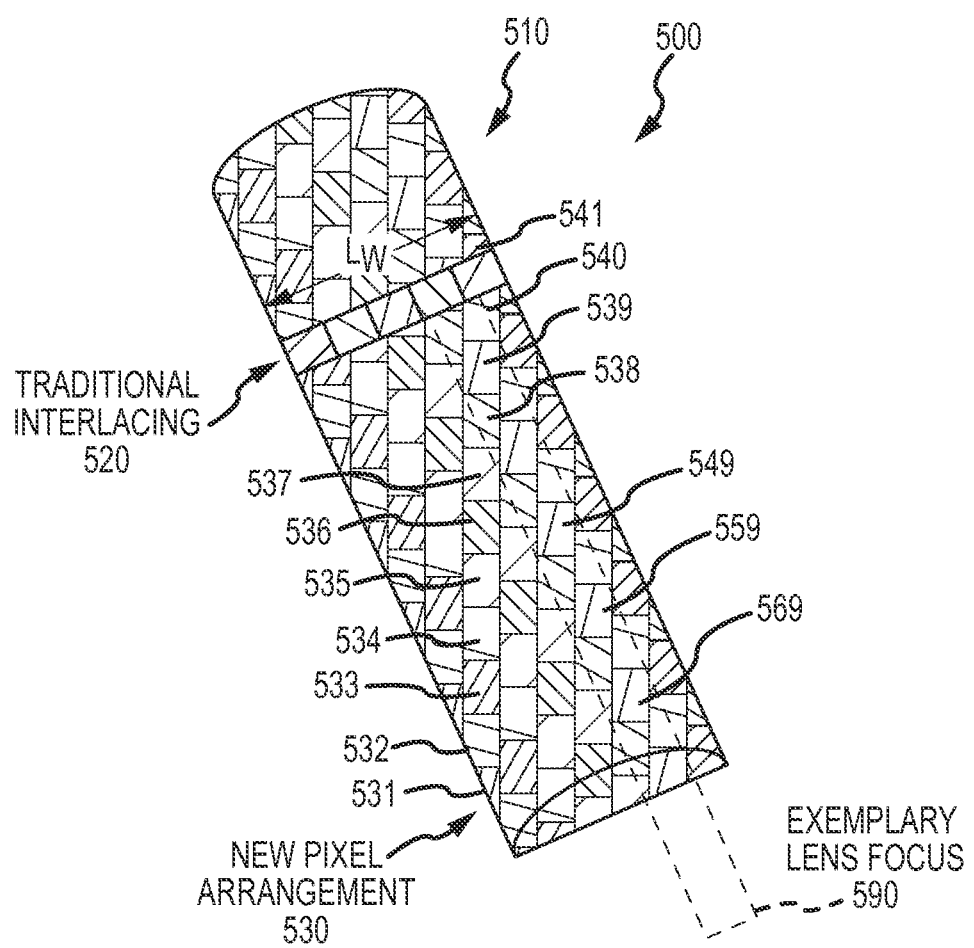
FIG. 5 is a diagram of traditional interlacing and an example of non-orthogonal or matrix interlacing as taught herein, with both being used with a slant lens.

The diagram 500 of FIG. 5 and the illustrated ideal or goal interlacing 530 is useful for demonstrating that the use of non-orthogonal interlacing would be desirable for increasing the amount of information that can be placed under a slant lens 510. However, a limitation facing those skilled in the art trying to fabricate a slant lens lenticular device is how to work with printing limitations of output devices or printers used to provide or print the interlaced image (e.g., provide the ink layer underneath a lens sheet). With this problem in mind, the inventors recognized that it would be desirable to provide a matrix of pixels or a pixel map that can be used to generate a print file for controlling a printer/output device. In other words, each image or frame may be first stored digitally as a set of pixels, and pixels from each frame may be arranged or combined (interlaced) according to a predefined matrix of pixels or pixel map to achieve a print file with non-orthogonal interlacing suited for a particular slanted lenticular material (e.g., a transparent lens sheet with lenses slanted from vertical/horizontal at a particular or predefined angle).

Figure 6:
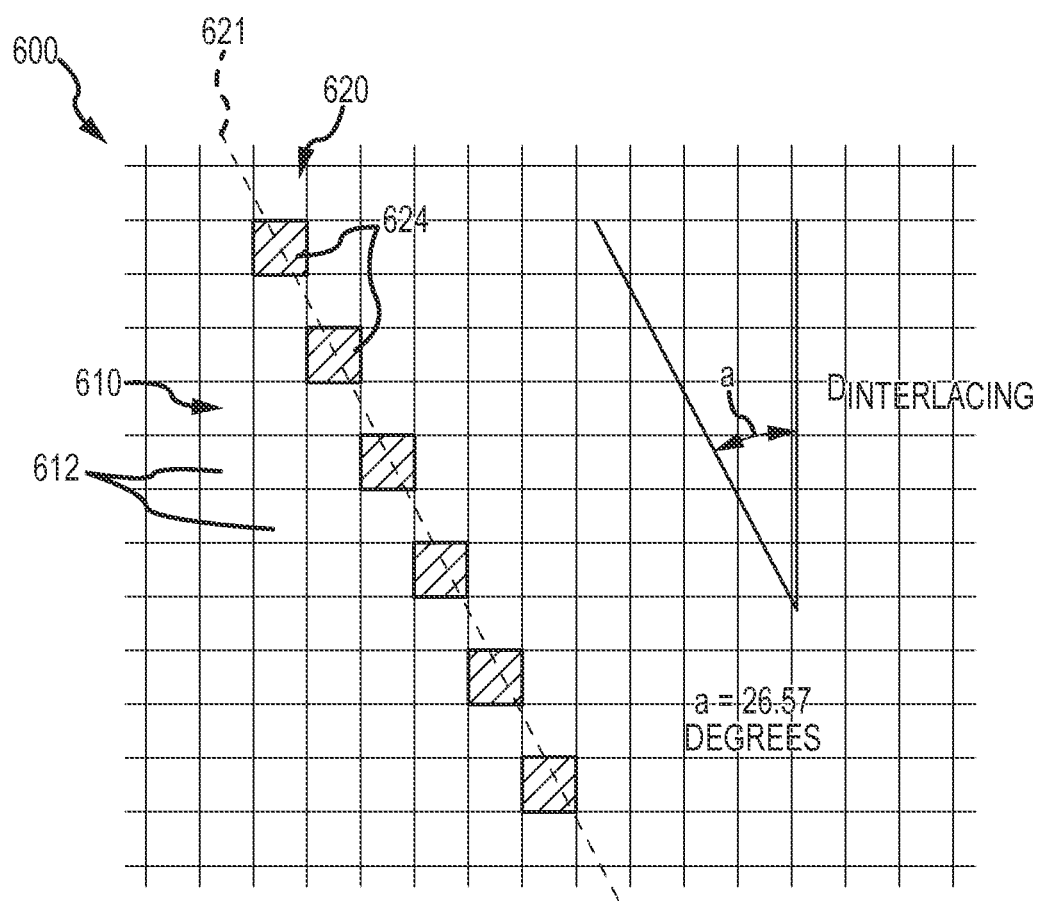
FIGS. 6-9 each illustrate a diagram of an exemplary step of non-orthogonal interlacing that may be used in generating a pixel map for creating a digital print file.

FIG. 6 illustrates a diagram or schematic 600 of a step in a non-orthogonal interlacing process that may be carried out to generate a pixel map for creating a digital print file from a set of frames or images (e.g., 6 or more frames used in creating a 3D graphic under slant lens lenticular material). A first frame or image may be chosen for processing, and this image/frame may be pixilated or separated into individual pixels of a certain size and location (X, Y coordinates) within the image/frame. Then, as shown in FIG. 6, a blank pixel map 610 is provided made up of rows and columns of pixels 612 (or pixel locations for receiving or being assigned pixels from the interlaced images). Then, as shown in FIG. 6, a string or line 620 of pixels 624 from a single frame/image of the set of frames/images to be interlaced/combined are positioned in the pixel map 610 at locations/coordinates 612 to follow a particular angle, a, which is measured as shown between a longitudinal axis (or edge) of a slant lens and a vertical line (which defines the interlacing distance, $D_{Interlacing}$, for the slant lens).

Due to the rigidity of the pixel map 610 with its orthogonal rows and columns of pixel locations 612, the inventors understood that it is preferable to map the pixels 624 of string/line 620 to follow a predefined angular offset. Here, angle, a, is 26.57 degrees (e.g., 20 to 30 degrees) as the pixels 624 are arranged in a pattern to define a line or string 620 (shown to be linear with dashed line 621) that will be concurrently visible through a slant lens with a similar angular offset (e.g., from vertical or horizontal in the lens sheet).

In practice, the mapping 610 is created by placing a first pixel 624 and then placing a next pixel at the desired angular offset (e.g., vertically down two pixel locations 612 in the same column and over one pixel location 612 to an adjacent row when starting in an upper "left" position), and then repeating this process to the end/edge of the pixel map 610. In this example, since sin 26.57 degrees=0.4226, the interlacing distance, $D_{Interlacing}$ as shown in FIG. 4 is given by $D_{Interlacing}=L_W/\sin a$ or $L_W/0.4226$. This provides about double the space to print frames (pixels associated with frames) with the same lens size, $L_W$, and with the same resolution.

Figure 7:
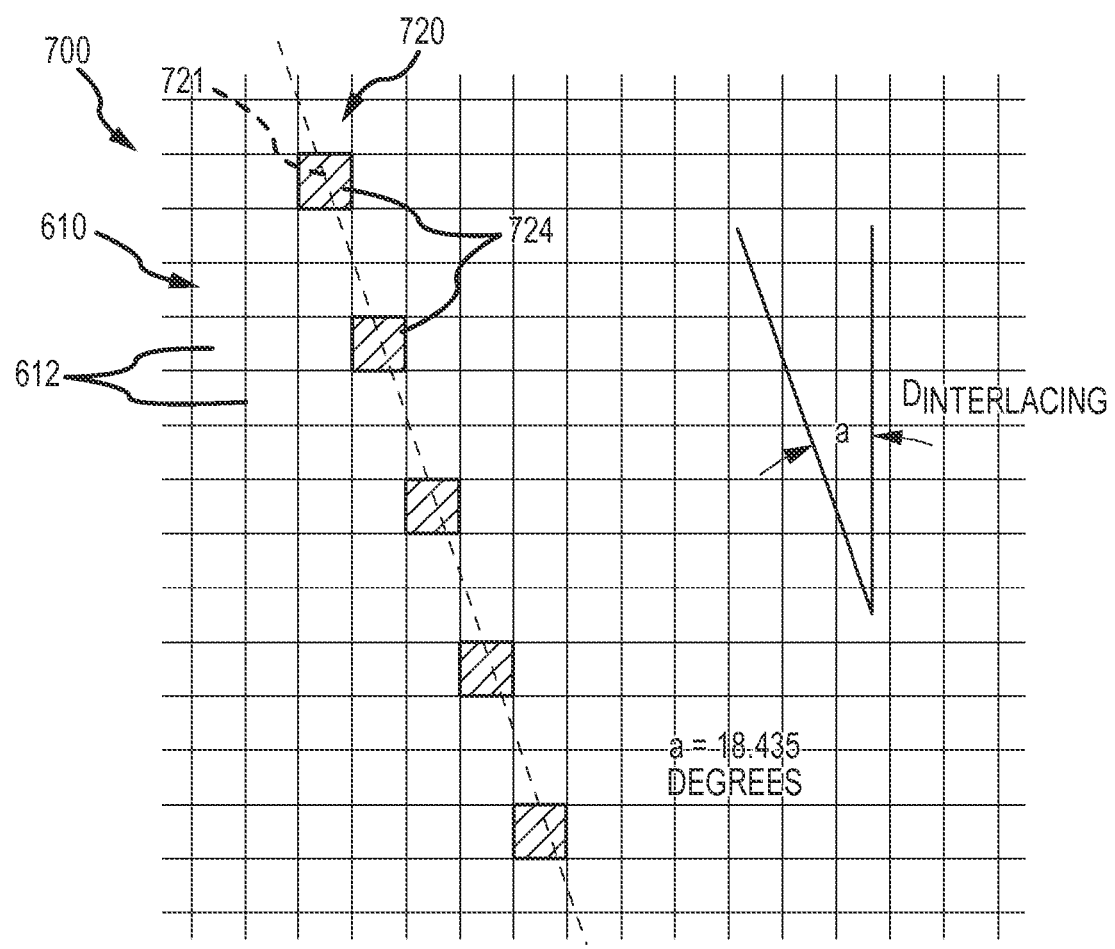

In FIG. 7, a blank pixel map 610 again may be provided with a plurality of rows and columns of pixel locations (for pixels of a particular size to suit an output device resolution or the like). Diagram 700 shows a step of a non-orthogonal interlacing being performed to create a pixel map for a slant lens with an angular offset of 18.435 degrees (e.g., slant angle, a, is in the range of 15 and 20 degrees with about 18.5 degrees being more ideal). As shown, pixels 724 of a single frame/image of a set of frames/images being combined/interlaced are arranged as shown in a pixel line or/string 720 (shown to be linear with dashed line 721).

Relative to vertical (or horizontal in some cases), the pixels 724 are arranged in the line/string 720 at an offset of 18.435 degrees (e.g., by placing a first pixel 724 at a location 612 and then stepping down (or up) three locations 612 in the same column and one location 612 over in a row to an adjacent column and then repeating this process to the edge/end of the map 610). In this example, since sin 18.435 degrees=0.3162, the interlacing distance, $D_{Interlacing}$ as shown in FIG. 4 is given by $D_{Interlacing}=L_W/\sin a$ or $L_W/0.3162$. This provides about triple the space to print frames (pixels associated with frames) with the same lens size, $L_W$, and with the same resolution.

Figure 8:
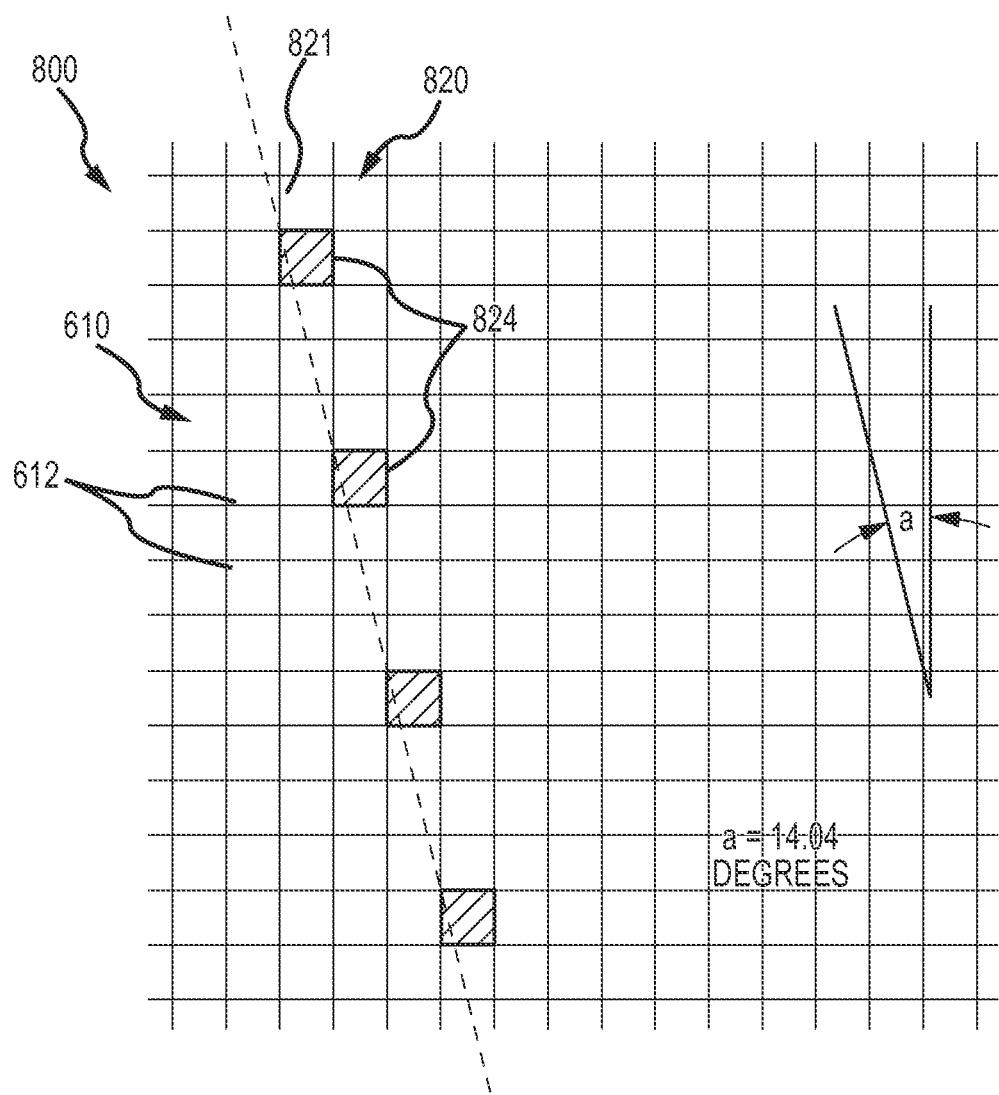

In FIG. 8, a blank pixel map 610 again may be provided with a plurality of rows and columns of pixel locations (for pixels of a particular size to suit an output device resolution or the like). Diagram 800 shows a step of a non-orthogonal interlacing being performed to create a pixel map for a slant lens with an angular offset of 14.04 degrees (e.g., slant angle, a, is in the range of 10 and 15 degrees with about 14 degrees being more ideal). As shown, pixels 824 of a single frame/image of a set of frames/images being combined/interlaced are arranged as shown in a pixel line or/string 820 (shown to be linear with dashed line 821).

Relative to vertical (or horizontal in some cases), the pixels 824 are arranged in the line/string 820 at an offset of 14.04 degrees (e.g., by placing a first pixel 824 at a location 612 and then stepping down (or up) four locations 612 in the same column and one location 612 over in a row to an adjacent column and then repeating this process to the edge/end of the map 610). In this example, since sin 14.04 degrees=0.2426, the interlacing distance, $D_{Interlacing}$ as shown in FIG. 4 is given by $D_{Interlacing}=L_W/\sin a$ or $L_W/0.2426$. This provides about quadruple or four times the space to print frames (pixels associated with frames) with the same lens size, $L_W$, and with the same resolution.

Figure 9:
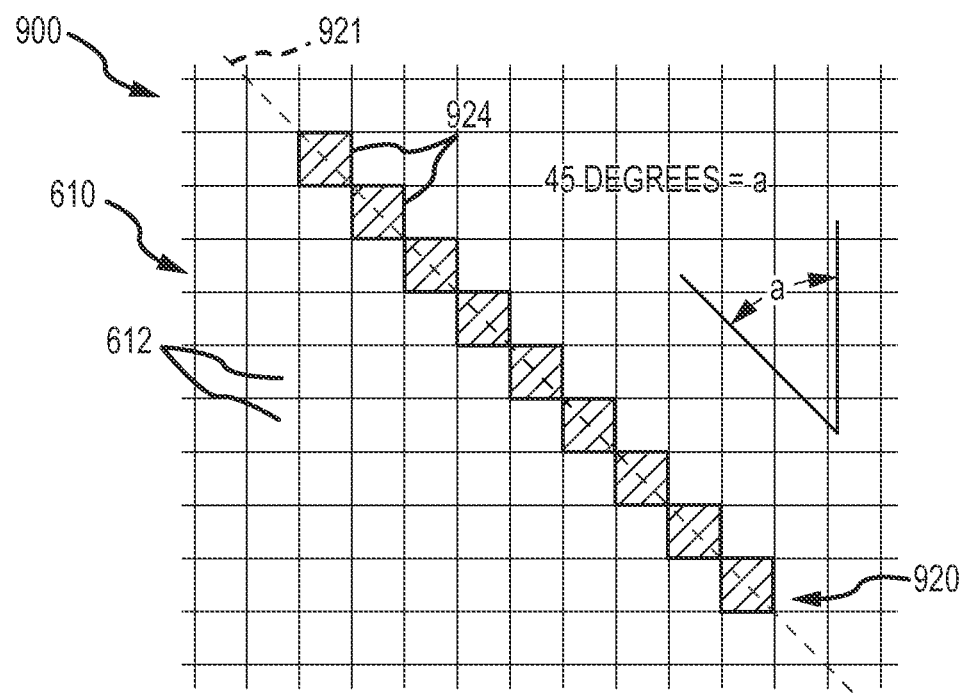

In FIG. 9, a blank pixel map 610 again may be provided with a plurality of rows and columns of pixel locations (for pixels of a particular size to suit an output device resolution or the like). Diagram 900 shows a step of a non-orthogonal interlacing being performed to create a pixel map for a slant lens with an angular offset of 45 degrees (e.g., slant angle, a, is in the range of 40 and 50 degrees with about 45 degrees being more ideal). As shown, pixels 924 of a single frame/image of a set of frames/images being combined/interlaced are arranged as shown in a pixel line or/string 920 (shown to be linear with dashed line 921). Relative to vertical (or horizontal in some cases), the pixels 924 are arranged in the line/string 920 at an offset of 45 degrees (e.g., by placing a first pixel 924 at a location 612 and then stepping down (or up) one location 612 in the same column and one location 612 over in a row to an adjacent column and then repeating this process to the edge/end of the map 610).

The arrangement of pixels in rows and columns presents some limitations as to the interlacing of the pixels, but it is likely that these four achievable slant or offset angles for use in interlacing pixels of the same image will prove beneficial in manufacturing lenticular products with slanted lenticules. The creation of the print file would then continue in each of these examples with selection of pixels of differing frames/images, and then arrangement of such pixels in a similar manner nearby to the pixels already positioned in the pixel map 610 until all (or most) of the pixel locations 612 are occupied.

Figure 10:
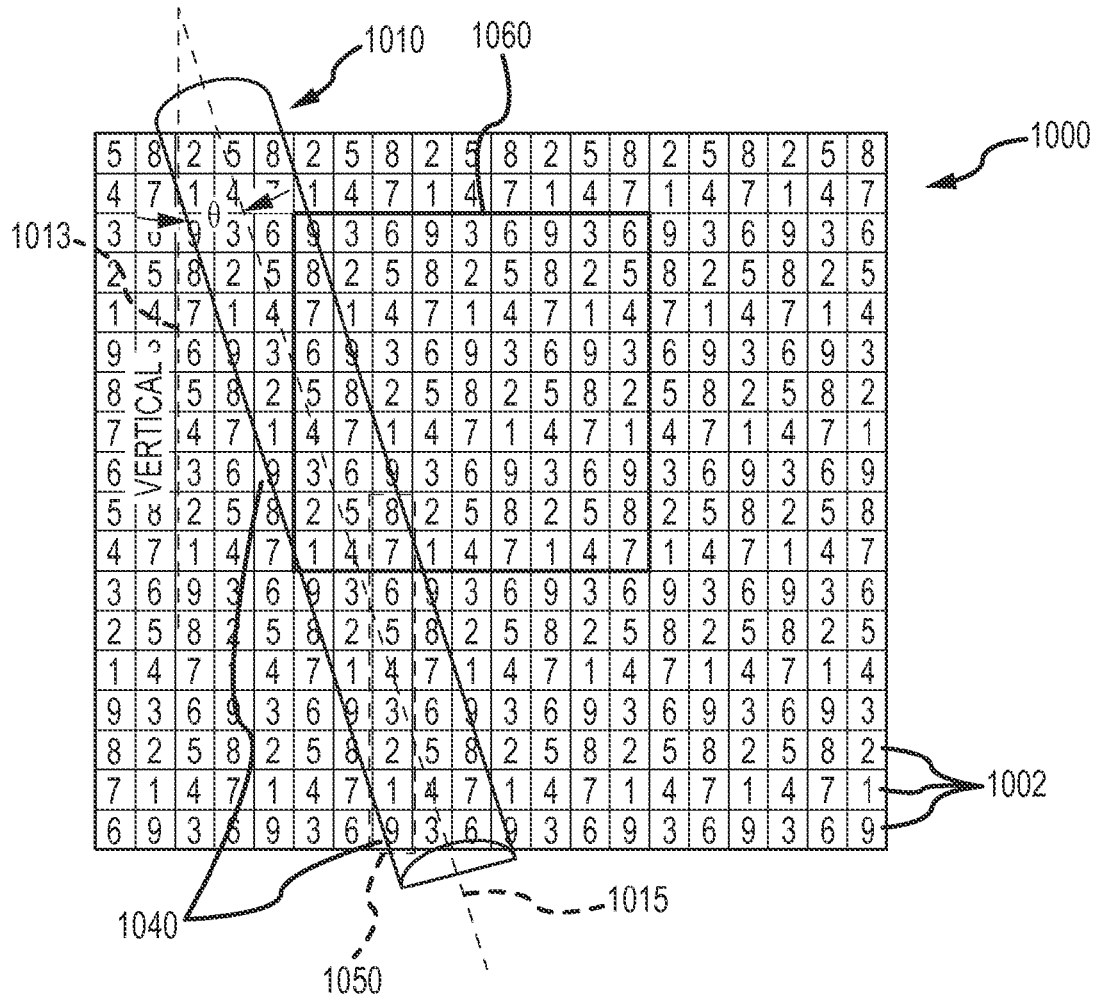
FIG. 10 illustrates a pixel map or matrix of pixels arranged in a pattern useful for interlacing nine frames or images to provide the 18.435 degree, non-orthogonal configuration discussed with reference to FIG. 7.

FIG. 10 illustrates a pixel map or matrix of pixels 1000 arranged in a pattern useful for interlacing nine frames or images to provide the 18.435 degree, non-orthogonal configuration discussed with reference to FIG. 7. In this example, nine frames are to be interlaced and printed in an ink or image layer for use with a lens sheet with slanted lenticules or slant lenses that are angled or offset from vertical by about 18.435 degrees. To this end, a single lens 1010 is shown positioned over the pixel map 1000, and the longitudinal axis 1015 of the lens 1010 is shown to be at a slant or offset angle, θ, to vertical (but this could also be horizontal) 1013 of about 18.435 degrees. In the matrix 1000 the numbered pixels or pixel locations 1002 represent locations where pixels from interlaced images/frames would be located when printing is performed using a print file built upon the map or matrix 1000.

Specifically, the matrix 1000 is used to interlace nine frames or images and numbers 1 through 9 are placed in each of the pixels or pixel locations 1002 in the map (e.g., each spot in the rows and columns of the map/matrix 1000), with each like number representing a pixel from the same frame/image (e.g., all pixel locations 1002 filled with a "4" would correspond to pixels from a fourth frame/image) and at locations in such frame/image corresponding with the locations in the pixel map/matrix 1000. For example, a "9" in the center of the map/matrix 1000 corresponds with a pixel in the ninth frame/image located in about the center of the frame/image. As another example, a "3" located in the lower left hand corner of the map/matrix 1000 corresponds with a pixel in the lower left hand corner of the third frame/image of the set of nine frames/images being combined to form an interlaced or combined print file.

The lens 1010 is useful for showing that pixels at pixel locations underneath the lens 1010 are aligned to be parallel with the longitudinal axis 1015 of the lens 1010 are concurrently visible while the interlacing is non-orthogonal (i.e., is along a column in the map/matrix 1000 (but could be along a row if the lens 1010 were angled from horizontal rather than vertical)). For example, as shown at 1040, a set of "9" pixels provided at the pixel locations 1040 in the map/matrix 1000 would be visible to a viewer via the lens 1010 from a particular point of view. In other words, following an inclination of 18.435 degrees in the map/matrix 1000 (and under the lens 1010 having this same slant to vertical 1013) all the digits are the same within pixel locations (e.g., when used to create a print file the map/matrix 1000 calls for pixels from a single image to be aligned along an inclination of 18.435 degrees).

However, the interlacing of pixels is non-orthogonal to the lens longitudinal axis 1015 as shown with the set 1050 of interlaced pixels (or pixel locations in the map/matrix 1000) that includes pixels from each frame/image. The interlacing process or algorithm may be generated based on the teaching of FIG. 7, in this example, and it is performed to align pixels of like frames/images with the longitudinal axis of the lens 1010 while providing non-orthogonal or matrix interlacing of pixels of each of the frames/images across the lens 1010.

The inventors noted during the interlacing process that repeating submatrices may be identified, and these may be repeated (e.g., placed side-by-side and stacked upon each other in a repetitive manner) to generate a map or matrix 1000 of a desired size and/or shape to suit a particular lens sheet. One exemplary interlacing submatrix is shown at 1060 that can be used in providing non-orthogonal interlacing of nine frames/images to suit a lens sheet with lenticules or lenses slanted to 18.435 degrees (i.e., to place pixels from each frame at inclines or angular offsets of 18.435 degrees for proper viewing through the lens 1010). Similar pixel maps or matrices can readily be generated for other lens sheets with different angular slants or offsets from vertical (such as for 14.04 degrees, 26.57 degrees, and 45 degrees (with ranges of about 5 or more degrees on either side of these values)).

Figure 11A:
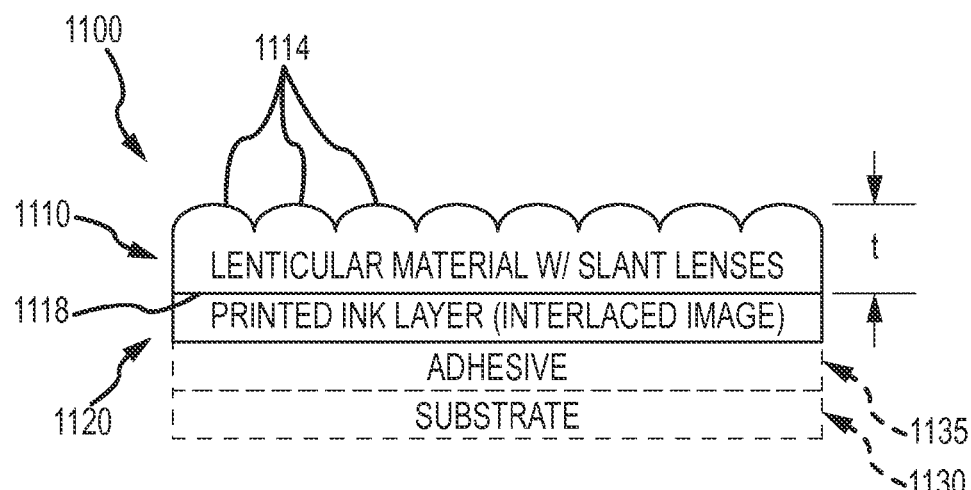
FIGS. 11A-11C illustrate, schematically, end views of lenticular products or assemblies that may be fabricated using the non-orthogonal interlacing or matrix interlacing taught herein.
Figure 11B:
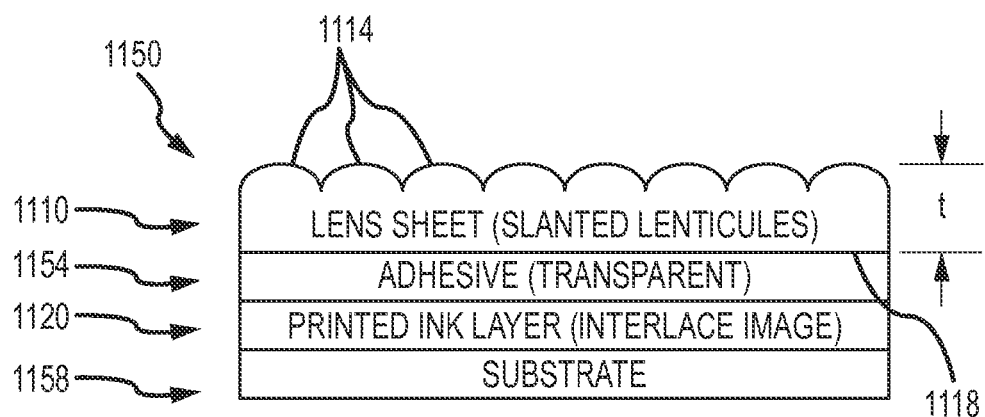

FIGS. 11A and 11B illustrate, schematically, end views of lenticular products or assemblies that may be fabricated using the non-orthogonal interlacing or matrix interlacing taught herein. As shown, the lenticular assembly or product 1100 includes a lens sheet or piece of lenticular material 1110 with a first (or top) side or surface with a plurality of lenticules or elongated lenses 1114 that are arranged to be angled or angularly offset ("slanted") relative to a vertical (or horizontal) axis of the lens sheet 1110. For example, the lenticules 1114 may be slanted at 10 to 45 degrees, with some embodiments using slant angles of 14.04 degrees, 18.435 degrees, 26.57 degrees, or 45 degrees for the lenticules 1114.

The product 1100 further includes an interlaced image provided by printing an ink layer 1120 directly onto the second (or bottom) side or surface 1118 of the lens sheet 1110. The ink layer 1120 is printed according to a print file or digital combined file in which a number of frames/images have been interlaced according to the teaching provided in this description. In one example, the lenses 1114 are provided at sizes associated with 75 LPI up to 2500 LPI, and the use of the non-orthogonal or matrix interlacing allows the thickness, t, of the lens sheet 1110 to be thinner than traditional interlacing as more information (or pixels) can be placed under each lens 1114. For example, the thickness, t, may be relatively thick such as about 20 mils or be very thin down to about 10 microns and still provide 3D or other quality imagery with the printed layer or ink layer 1120 (e.g., the range of thicknesses, t, is about 10 micron to 20 mils). The lenticular product 1100 may then be laminated upon or attached to a substrate 1130 (such as a bank note or piece of currency) via film 1135 of transparent adhesive.

FIG. 11B illustrates another lenticular product or assembly 1150 that may include the lens sheet 1110 with its slanted lenticules 1114 combined with the interlaced image in printed or ink layer 1120. In this assembly 1150, though, the ink 1120 is printed onto a substrate 1158, and the lens sheet 1110 and substrate 1158 are assembled with a film of adhesive 1154, with ink layer 1120 facing the second or back side 1118 of the lens sheet 1110. In other words, the interlaced image may first be printed in a print step or process and then later assembled with the lens sheet 1110 to provide a lenticular assembly or product 1150. The lenticular products 1100 and 1150 may take many forms to practice the present description. For example, the products 1100, 1150 may take the form of security threads or stamps for use with currency or bank notes.

Figure 11C:
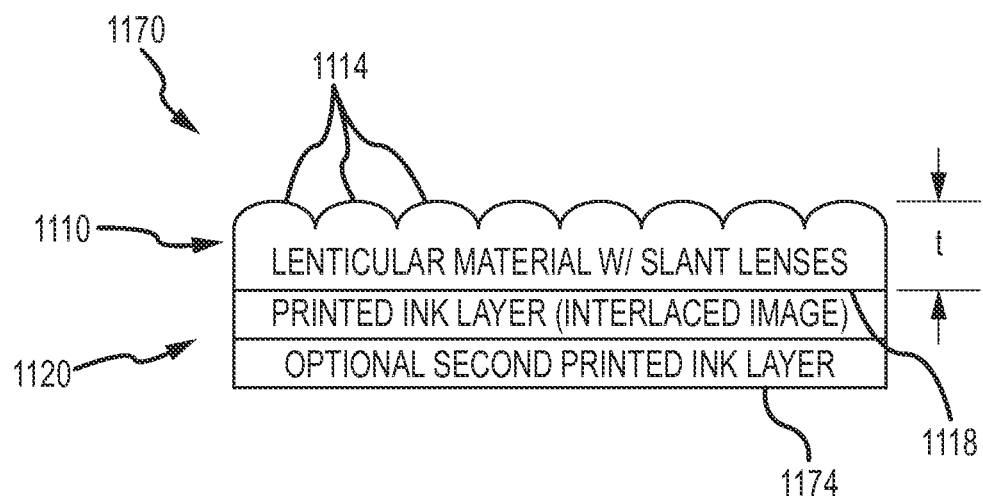

FIG. 11C illustrates a lenticular product or assembly 1170 that may include the lens sheet 1110 with its slanted lenticules 1114 combined with the interlaced image in printed or ink layer 1120. In this assembly 1170, the ink 1120 is printed directly onto the back surface 1118 of the lens sheet 1110. This relatively simple construction is useful for many objects/products 1170 such as a polymer bank note or another clear-to-translucent (or "transmissive") product (e.g., with a clear layer 1110) that includes a printed image at the back 1118 of the lenses 1114 with an ink layer. As shown, the lenticular product or assembly 1170 may also include an additional layer of ink 1174 that may be used to provide an image that faces away from the lenses 1114 that can be viewed directly by an observer from the back side of the product 1170 (e.g., the side without lenses/lenticules 1114), and this image may be a regular or conventional image that does not require lenses for proper viewing (focusing for the viewer on the image in the ink layer 1174 provided directly onto the printed ink layer 1120 or onto a clear or opaque substrate layer supporting or covering the ink layer 1174).

In practice, the process of fabricating a lenticular product or assembly may involve first determining or knowing the resolution available to print a specific product and a thickness that is targeted or the goal thickness for the product. Then, based on these parameters or limitations, a "best" or useful option is chosen in terms of the specific angle or matrix that is to be used for the non-orthogonal or non-traditional slant lens interlacing. Next, the mechanical or real LPI lens is defined that will be produced and used in the product to match these product characteristics.

Figure 12:
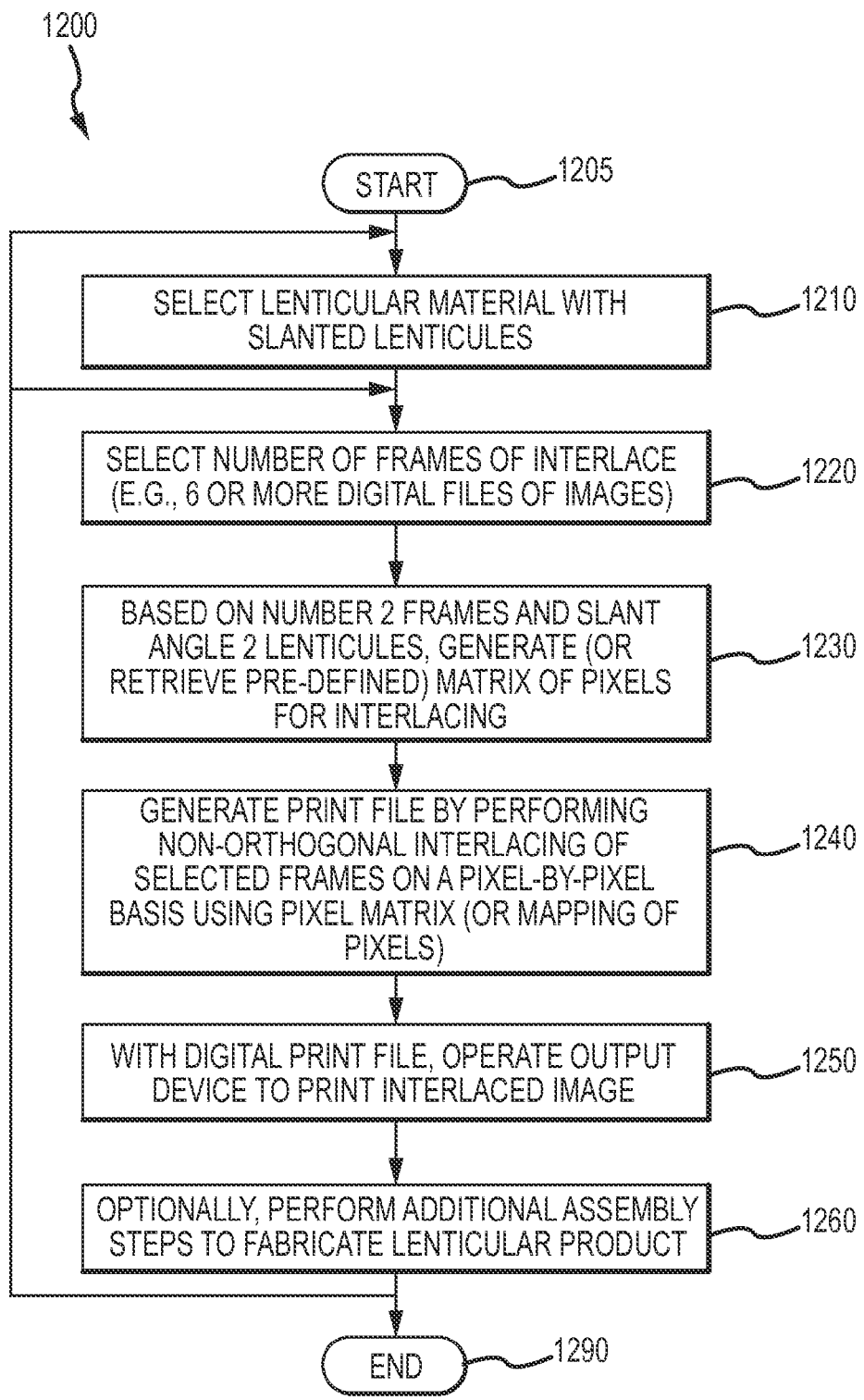
FIG. 12 illustrates a flow diagram of a method of fabricating a lenticular produce assembly combining slant lens material with an image printed according with the non-traditional interlacing taught herein.

FIG. 12 illustrates a method 1200 for fabricating a lenticular product such as a security thread or stamp for currency or bank notes using the non-orthogonal printing of the present description. The method 1200 starts at 1205 such as with designing a desired image (e.g., 3D imagery), selecting or defining operating parameters of output device (e.g., resolution of a digital printer), selecting materials for the ink layer, lens sheet, and an adhesive/substrate if used. At step 1210, the method 1200 continues with selecting the lenticular material to be used in the lenticular product. This may involve selecting a transparent plastic or synthetic material that has a particular thickness (e.g., 10 microns and up) such as a thickness of adjacent substrate(s) as in the case of a currency security thread or the like.

Step 1210 also involves defining or setting the size (i.e., LPI) of the lenticules on the surface of the lenticular material and also defining or setting the slant or offset angle for each lenticule. As discussed above, it may be useful to use a slant angle of 10 to 45 degrees with angles of 14.04 degrees, 18.435 degrees, 26.57 degrees, and 45 degrees for the lenticules being well suited to the non-orthogonal or matrix interlacing.

At step 1220, the method 1200 involves selecting a number of frames (or digital image files) to use in creating a visual effect with the lenticular material selected in step 1210. To provide 3D imagery, it may be desirable to select 6 to 12 or more frames, and the number of frames may be selected (or limited) by the size of the pixels achievable with the output device (DPI of the printer selected in step 1205). Note, steps 1205, 1210, and 1220 may be performed in a fully or partially concurrent matter due to the interrelationships between the parameters/characteristics of a lenticular product (e.g., LPI, DPI, lens size, and angular offset) as discussed in detail above.

At step 1230, the method 1200 continues with generating a matrix of pixels (or pixel map) for use in interlacing the selected frames from step 1220. This pixel matrix may take the form of matrix 1000 (e.g., if the number of frames is nine and the slant angle is 18.435 degrees) or may be generated following the processes described with reference to FIGS. 5-9 to suit a particular slant angle and number of frames (as well as other parameters such as lens size). The pixel matrix may then be stored as a digital file for use in later steps. In some cases, a plurality of pixel matrices or pixel maps may be generated for each combination of interlacing parameters, and the matching pixel matrix may be retrieved from memory at step 1230 (e.g., one skilled in the art may generate pixel matrices to suit each lens sheet they may use in future fabrication processes as well as pixel matrices suited to differing numbers of frames, lens sizes, and output device resolutions).

At step 1240, the method 1200 continues with generating a print file for controlling an output device (e.g., a digital printer) to print an interlaced image. This may involve performing non-orthogonal interlacing of the frames/images chosen in 1220 using the pixel matrix of step 1230. Each frame of step 1220 may pixilated (e.g., divided into a number of pixels matching that of the pixel map for each frame) and then these pixels may be plugged into pixel locations for corresponding pixels from the frames defined in the pixel map.

The method 1200 can then continue at 1250 by using the digital print file from step 1240 to operate an output device to print an interlaced image (an ink layer with pixels from each frame printed according to the pixel matrix). The printed image may be provided directly on the planar, back side of a sheet of the lenticular material selected in step 1210 or it may be printed onto a substrate. Then, in step 1260, the lenticular product may be completed such as by attaching the lens sheet with its printed ink layer to a substrate (laminate lens with interlaced image on another object such as a security stamp onto a bank note). In other cases, step 1260 may involve attaching a substrate upon which the interlaced image was printed onto the back of a lens sheet/lenticular element with a transparent (or at least highly translucent) adhesive. The method 1200 may then end at 1290 or may continue at step 1210 (e.g., selecting a different lenticular material such as with lenticules at a different slant angle or with lenticules of a different size or a sheet with a different thickness) or step 1220 (e.g., selecting a different set of frames or different number of frames to create a lenticular product).

Figure 13:
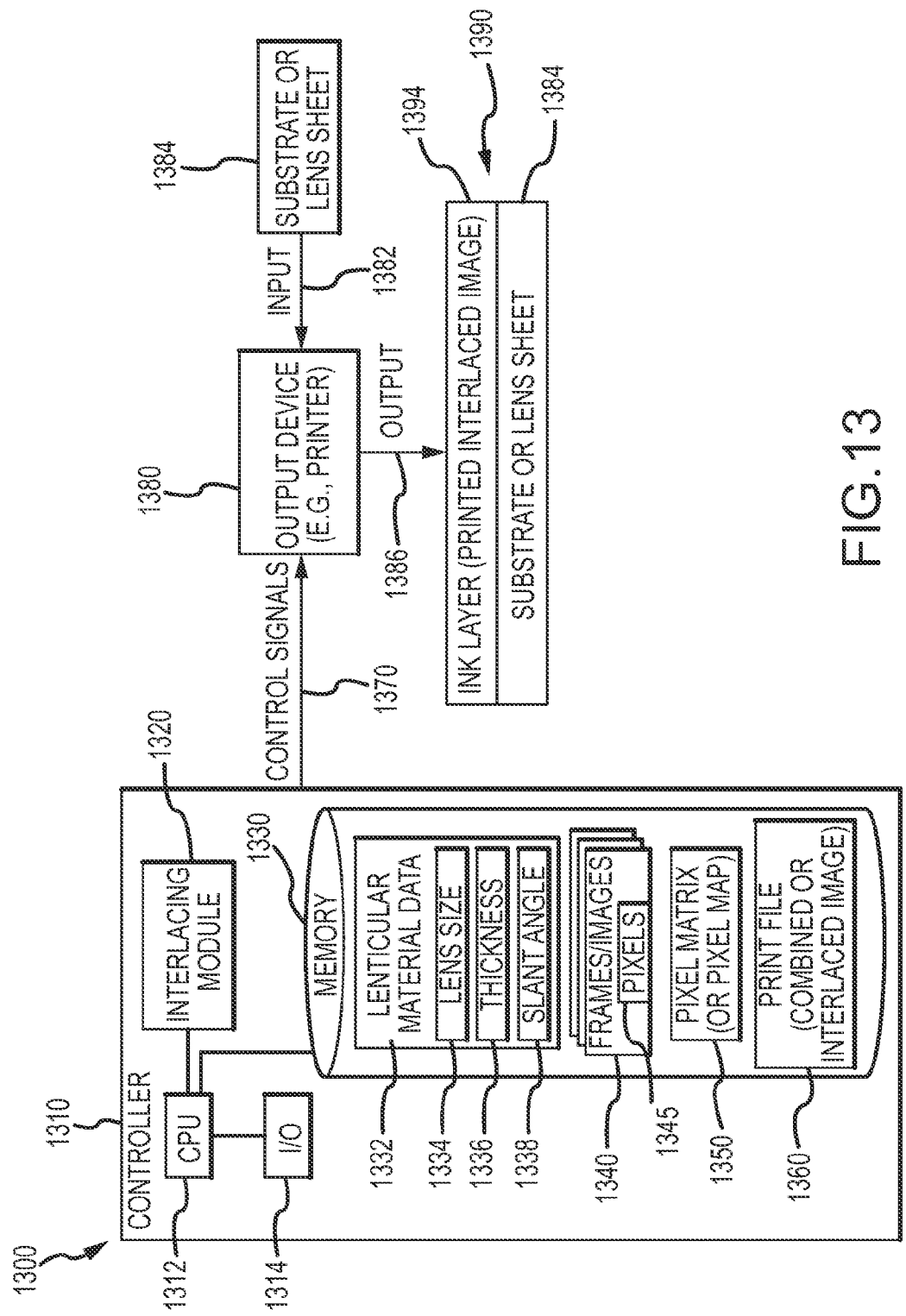
FIG. 13 illustrates a functional block diagram of a system for printing a non-orthogonally interlaced image for use with slanted lenticules (e.g., with lenticular material with slanted lenses)

FIG. 13 illustrates a functional block diagram of a system 1300 useful for printing an image onto a substrate or lens sheet with an interlacing pattern as described herein. The system 1300 includes a controller 1310 which may take the form of nearly any computing device specially configured as shown. The controller 1310 includes a processor 1312 executing computer programs or readable code to perform the functions of an interlacing module 1320. The controller 1310 also controls or manages one or more input/output devices 1314 such as a keyboard, a mouse, a touch pad and/or touch screen, a monitor, and a user interface provided graphically on the monitor to allow an operator to interact with the controller (e.g., initiate the interlacing module, provide input such as to select a lenticular material with its slanted lenticules, select frames for interlacing under the lenticular material, and so on). The CPU 1312 also manages operation of memory 1330 which may store the code for module 1320 in readable format.

In the memory 1330, a set of lenticular material data 1332 is stored that defines parameters or characteristics of a lens sheet upon which an interlaced image will be printed. For example, the data 1332 may include the lens size (e.g., LPI used to form the lens sheet), the thickness (e.g., 10 to 2500 microns or the like), and the slant or offset angles of the lenticules of the lens sheet. The memory 1330 also stores a number of frames or images in digital form that are to be interlaced with the interlacing module 1320, and these images/frames 1340 may be selected from a larger set (not shown) by the user of the controller via user input with I/O 1314. Each of the frames/images is digital and is made up of a number of pixels (which may be selected to have a number or resolution similar to the pixel map 1350 or a subset of the pixels 1345 may be used in the interlaced or print file 1360).

The memory 1330 further is used to store a pixel matrix 1350 generated by the interlacing module 1320, and the pixel matrix 1350 may take the form of matrix 1000 of FIG. 10 and may be generated by the interlacing module 1320 as discussed with reference to any of FIGS. 5-10 and 12. The interlacing module 1320 may further operate to generate a print file 1360 from the frames/images 1340 and the pixel matrix 1350, e.g., by selecting pixels 1345 from each image and placing them in corresponding pixel locations in the pixel matrix 1350 (which is selected to suit the slant angel 1338, the number of frames 1340, and the lens size 1334).

As shown, the system 1300 further includes an output device 1380 such as a printer with a particular DPI resolution (or multiple resolutions). The controller 1310 acts to transmit control signals 1370 based on the print file 1360 to the output device 1380. Input 1382 is provided to the controller 1380 in the form of a substrate or a lens sheet 1384, and the output device 1380 prints ink onto the substrate or planar side of the lens sheet 1384 in the pattern defined by the control signals 1370 (e.g., the print file 1360). Upon completion of printing, the output device 1380 outputs 1386 a product/assembly 1390 made up of the substrate or lens sheet 1384 and an ink layer 1394 providing the printed interlaced image.

From the above description, it will be understood that for many years lenticular optics have been used with interlaced printed images or as a print medium. The general costs are high relative to normal printing because of the expense of the material. In addition, making thinner lenses work with limited resolution in a digital device or with traditional plate setting equipment makes it very difficult if not impossible to print interlaced images on very thin lens arrays or lens sheets because it is not supported by the traditional interlacing mathematics and corresponding lens arrays.

In contrast, the present invention and description combines an angled lens or lenticule with stair-stepped interlacing or display of images (e.g., see the interlacing of FIGS. 5-10) to allow two to four times the amount of data to be printed under the slant/angled lens or lenticule when compared with traditional interlacing. Conversely, the non-traditional (or non-orthogonal) interlacing taught herein supports a reduction in lens sheet thickness of up to or more than two thirds (up to 67 percent or more thickness reduction) to achieve the same imagery provided by a much thicker lens sheet or array with traditional slant lens interlacing. Hence, more than half and up to two thirds of the cost of producing traditional lens arrays can be eliminated.

The non-orthogonal or matrix interlacing for slant lens taught herein teaches that when a lens sheet is formed with lenses made at set or predefined angles the corresponding pixels should be placed under the lenses in a grid format (e.g., see FIG. 10 for one useful pixel mapping for 9 frames under lenses at a slant angle of 18.435 degrees (or 15 to 20 degrees)). The grid format or pixel matrix is designed so that the like pixels or pixels of a single frame are aligned with the lens or parallel to its longitudinal axis. In this way, one can use up to two thirds (or 67 percent) less print resolution to accomplish the same graphic or can take up to two thirds (or 67 percent) of the mass out of the lens array and accomplish the same imagery.

For example, a digital web lens at only 5 mils can be made to print on an HP® Indigo output device at about 812 DPI using nine frames with a mechanical LPI of about 270 LPI. The lens will each focus at 5 mils but printing this web lens with traditional slant lens interlacing is impossible with nine frames (which is a useful number of frames for 3D imagery). Normally, with traditional interlacing, the DPI necessary to print this lens would be LPI multiplied by frame count or, in this case, 270 LPI multiplied by 9 frames or 2430 DPI. In contrast, the non-orthogonal or matrix interlacing taught herein matched with the angle of the slant lens can be used to support a print resolution that is about one third that required with traditional interlacing or, in this case, a resolution of 810 DPI is useful (which is less than the resolution provided by existing output devices of 812 DPI). In other words, the resolution of the printer or output device can be matched nearly exactly using the non-orthogonal or matrix interlacing described above.

As taught, slant lenses can be engraved and indexed or made with a slight offset (e.g., like a screw) between 80 LPI and 1500 LPI, for example, at angles between about 10 and 46 degrees. An interlaced print file can be generated from a pixel matrix or map adapted for the slant angle of the lenses or lenticules in the lens sheet to provide non-orthogonal interlacing of pixels of differing frames as well as to correspond with the lens size (set by LPI) and number of frames/images to be interlaced. The description further teaches how to form or print an interlaced image with a number of pixels or amount of data that is at least double that achieved with traditional interlacing for slant lens. For example, a much larger number of frames or pixels associated with such frames may be printed non-orthogonally (e.g., along a vertical or column rather than orthogonally to the longitudinal axis of the slant lens as in traditional interlacing), with some embodiments using 6, 9, or 16 images/frames to produce an interlaced image using a pixel matrix or map. The interlaced image printed according to this description results in a lower DPI, by using the stepwise or stairway effect of interlacing, than with traditional slant lens interlacing formulas (e.g., DPI=2 LPI×Frame Count).

At this point, it may be useful to list some anticipated results that are achievable with the non-orthogonal or matrix/grid interlacing techniques. A lenticular product or assembly may be formed using a lens sheet with lenticules slanted at a slant angle of 14.04 degrees (such that the sine value is 0.2426). An interlaced image may be provided using 16 frames or images, such that the submatrix that is repeated in the pixel matrix or map is 16 by 16 pixels in size (e.g., see FIG. 10 where a 9 by 9 pixel submatrix 1060 is repeated). In this case, the step ratio (SR) or the increase in the amount of interlaced data when compared with traditional interlacing is 4.122. If the mechanical (or actual) LPI of the lens sheet is 77.5 LPI (or a lens chord width or size of 0.012903 inches), the effective LPI for interlacing (mechanical LPI divided by SR) is 18.801553 and, as a result, the DPI is 300.824 (with a dot size of 0.003324 inches) with the vertical interlacing distance, $D_{Interlacing}$, of 0.05319 inches (as determined by (1/mechanical LPI)/sin 14.04 degrees).

In another example, a lenticular product or assembly may be formed using a lens sheet with lenticules slanted at a slant angle of 14.04 degrees (such that the sine value is 0.2426). An interlaced image may be provided using 16 frames or images, such that the submatrix that is repeated in the pixel matrix or map is 16 by 16 pixels in size (e.g., see FIG. 10 where a 9 by 9 pixel submatrix 1060 is repeated). In this case, the SR is again 4.122. If the mechanical (or actual) LPI of the lens sheet is now 400 LPI (or a lens chord width or size of 0.0025 inches), the effective LPI for interlacing is 97.040272 and, as a result, the DPI is 1552.640 (with a dot size of 0.000644 inches) with the vertical interlacing distance, $D_{Interlacing}$, of 0.01031 inches (as determined by (1/mechanical LPI)/sin 14.04 degrees).

In another example, a lenticular product or assembly may be formed using a lens sheet with lenticules slanted at a slant angle of 14.04 degrees (such that the sine value is 0.2426). An interlaced image may be provided using 16 frames or images, such that the submatrix that is repeated in the pixel matrix or map is 16 by 16 pixels in size (e.g., see FIG. 10 where a 9 by 9 pixel submatrix 1060 is repeated). In this case, the SR is again 4.122. If the mechanical (or actual) LPI of the lens sheet is now 654.5 LPI (or a lens chord width or size of 0.001528 inches), the effective LPI for interlacing is 158.782145 and, as a result, the DPI is 2540.507 (with a dot size of 0.000394 inches) with the vertical interlacing distance, $D_{Interlacing}$, of 0.00630 inches (as determined by (1/mechanical LPI)/sin 14.04 degrees).

In still another example, a lenticular product or assembly may be formed using a lens sheet with lenticules slanted at a slant angle of 14.04 degrees (such that the sine value is 0.2426). An interlaced image may be provided using 16 frames or images, such that the submatrix that is repeated in the pixel matrix or map is 16 by 16 pixels in size (e.g., see FIG. 10 where a 9 by 9 pixel submatrix 1060 is repeated). In this case, the SR is again 4.122. If the mechanical (or actual) LPI of the lens sheet is now 619.51 LPI (or a lens chord width or size of 0.001614 inches), the effective LPI for interlacing is 150.293547 and, as a result, the DPI is 2404.690 (with a dot size of 0.000416 inches) with the vertical interlacing distance, $D_{Interlacing}$, of 0.00665 inches (as determined by (1/mechanical LPI)/sin 14.04 degrees).

In other cases, a lenticular product or assembly may be formed using a lens sheet with lenticules slanted at a slant angle of 18.435 degrees (such that the sine value is 0.3162). An interlaced image may be provided using 9 frames or images, such that the submatrix that is repeated in the pixel matrix or map is 9 by 9 pixels in size (e.g., see FIG. 10 where a 9 by 9 pixel submatrix 1060 is repeated). In this case, the step ratio (SR) or the increase in the amount of interlaced data when compared with traditional interlacing is 3.16260. If the mechanical (or actual) LPI of the lens sheet is 210 LPI (or a lens chord width or size of 0.004762 inches), the effective LPI for interlacing (mechanical LPI divided by SR) is 66.401062 and, as a result, the DPI is 597.618 (with a dot size of 0.001673 inches) with the vertical interlacing distance, $D_{Interlacing}$, of 0.01506 inches (as determined by (1/mechanical LPI)/sin 18.435 degrees).

In another example, a lenticular product or assembly may be formed using a lens sheet with lenticules slanted at a slant angle of 18.435 degrees (such that the sine value is 0.3162). An interlaced image may be provided using 9 frames or images, such that the submatrix that is repeated in the pixel matrix or map is 9 by 9 pixels in size (e.g., see FIG. 10 where a 9 by 9 pixel submatrix 1060 is repeated). In this case, the step ratio (SR) or the increase in the amount of interlaced data when compared with traditional interlacing is 3.16260. If the mechanical (or actual) LPI of the lens sheet is 285.71 LPI (or a lens chord width or size of 0.003500 inches), the effective LPI for interlacing (mechanical LPI divided by SR) is 90.340226 and, as a result, the DPI is 813.074 (with a dot size of 0.001230 inches) with the vertical interlacing distance, $D_{Interlacing}$, of 0.01107 inches (as determined by (1/mechanical LPI)/sin 18.435 degrees).

In a similar example, a lenticular product or assembly may be formed using a lens sheet with lenticules slanted at a slant angle of 18.435 degrees (such that the sine value is 0.3162). An interlaced image may be provided using 9 frames or images, such that the submatrix that is repeated in the pixel matrix or map is 9 by 9 pixels in size (e.g., see FIG. 10 where a 9 by 9 pixel submatrix 1060 is repeated). In this case, the step ratio (SR) or the increase in the amount of interlaced data when compared with traditional interlacing is 3.16260. If the mechanical (or actual) LPI of the lens sheet is 446.28 LPI (or a lens chord width or size of 0.002241 inches), the effective LPI for interlacing (mechanical LPI divided by SR) is 141.111744 and, as a result, the DPI is 1270.024 (with a dot size of 0.000787 inches) with the vertical interlacing distance, $D_{Interlacing}$, of 0.00709 inches (as determined by (1/mechanical LPI)/sin 18.435 degrees).

In another similar example, a lenticular product or assembly may be formed using a lens sheet with lenticules slanted at a slant angle of 18.435 degrees (such that the sine value is 0.3162). An interlaced image may be provided using 9 frames or images, such that the submatrix that is repeated in the pixel matrix or map is 9 by 9 pixels in size (e.g., see FIG. 10 where a 9 by 9 pixel submatrix 1060 is repeated). In this case, the step ratio (SR) or the increase in the amount of interlaced data when compared with traditional interlacing is 3.16260. If the mechanical (or actual) LPI of the lens sheet is 252 LPI (or a lens chord width or size of 0.003968 inches), the effective LPI for interlacing (mechanical LPI divided by SR) is 79.681275 and, as a result, the DPI is 717.142 (with a dot size of 0.001394 inches) with the vertical interlacing distance, $D_{Interlacing}$, of 0.01255 inches (as determined by (1/mechanical LPI)/sin 18.435 degrees).

In yet another similar example, a lenticular product or assembly may be formed using a lens sheet with lenticules slanted at a slant angle of 18.435 degrees (such that the sine value is 0.3162). An interlaced image may be provided using 9 frames or images, such that the submatrix that is repeated in the pixel matrix or map is 9 by 9 pixels in size (e.g., see FIG. 10 where a 9 by 9 pixel submatrix 1060 is repeated). In this case, the step ratio (SR) or the increase in the amount of interlaced data when compared with traditional interlacing is 3.16260. If the mechanical (or actual) LPI of the lens sheet is 845 LPI (or a lens chord width or size of 0.001183 inches), the effective LPI for interlacing (mechanical LPI divided by SR) is 267.185227 and, as a result, the DPI is 2404.701 (with a dot size of 0.000416 inches) with the vertical interlacing distance, $D_{Interlacing}$, of 0.00374 inches (as determined by (1/mechanical LPI)/sin 18.435 degrees).

In other cases, a lenticular product or assembly may be formed using a lens sheet with lenticules slanted at a slant angle of 26.57 degrees (such that the sine value is 0.4473). An interlaced image may be provided using 6 frames or images, such that the submatrix that is repeated in the pixel matrix or map is 6 by 6 pixels in size (e.g., see FIG. 10 where a 9 by 9 pixel submatrix 1060 is repeated). In this case, the step ratio (SR) or the increase in the amount of interlaced data when compared with traditional interlacing is 2.23560. If the mechanical (or actual) LPI of the lens sheet is 111.7 LPI (or a lens chord width or size of 0.008953 inches), the effective LPI for interlacing (mechanical LPI divided by SR) is 49.964215 and, as a result, the DPI is 299.780 (with a dot size of 0.003336 inches) with the vertical interlacing distance, $D_{Interlacing}$, of 0.02001 inches (as determined by (1/mechanical LPI)/sin 26.57 degrees).

In a similar example, a lenticular product or assembly may be formed using a lens sheet with lenticules slanted at a slant angle of 26.57 degrees (such that the sine value is 0.4473). An interlaced image may be provided using 6 frames or images, such that the submatrix that is repeated in the pixel matrix or map is 6 by 6 pixels in size (e.g., see FIG. 10 where a 9 by 9 pixel submatrix 1060 is repeated). In this case, the step ratio (SR) or the increase in the amount of interlaced data when compared with traditional interlacing is 2.23560. If the mechanical (or actual) LPI of the lens sheet is 223.5 LPI (or a lens chord width or size of 0.004474 inches), the effective LPI for interlacing (mechanical LPI divided by SR) is 99.973162 and, as a result, the DPI is 599.829 (with a dot size of 0.001667 inches) with the vertical interlacing distance, $D_{Interlacing}$, of 0.01000 inches (as determined by (1/mechanical LPI)/sin 26.57 degrees).

In another similar example, a lenticular product or assembly may be formed using a lens sheet with lenticules slanted at a slant angle of 26.57 degrees (such that the sine value is 0.4473). An interlaced image may be provided using 6 frames or images, such that the submatrix that is repeated in the pixel matrix or map is 6 by 6 pixels in size (e.g., see FIG. 10 where a 9 by 9 pixel submatrix 1060 is repeated). In this case, the step ratio (SR) or the increase in the amount of interlaced data when compared with traditional interlacing is 2.23560. If the mechanical (or actual) LPI of the lens sheet is 473.2 LPI (or a lens chord width or size of 0.002113 inches), the effective LPI for interlacing (mechanical LPI divided by SR) is 211.665772 and, as a result, the DPI is 1269.974 (with a dot size of 0.000787 inches) with the vertical interlacing distance, $D_{Interlacing}$, of 0.00472 inches (as determined by (1/mechanical LPI)/sin 26.57 degrees).

In yet another similar example, a lenticular product or assembly may be formed using a lens sheet with lenticules slanted at a slant angle of 26.57 degrees (such that the sine value is 0.4473). An interlaced image may be provided using 6 frames or images, such that the submatrix that is repeated in the pixel matrix or map is 6 by 6 pixels in size (e.g., see FIG. 10 where a 9 by 9 pixel submatrix 1060 is repeated). In this case, the step ratio (SR) or the increase in the amount of interlaced data when compared with traditional interlacing is 2.23560. If the mechanical (or actual) LPI of the lens sheet is 894 LPI (or a lens chord width or size of 0.001119 inches), the effective LPI for interlacing (mechanical LPI divided by SR) is 399.892646 and, as a result, the DPI is 2399.317 (with a dot size of 0.000417 inches) with the vertical interlacing distance, $D_{Interlacing}$, of 0.00250 inches (as determined by (1/mechanical LPI)/sin 26.57 degrees).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The matrix for a 45 degree offset or slant angle typically would be 5 by 5 frames (or 5×5 pixels). Note, also, there are some cases where using the techniques described herein allows one to gain more space than the minimum requirement. For example, when a multiple of each matrix is used to generate the pixel matrix or map, the overall pixel matrix or map would be a multiple of the base or submatrix, e.g., a 9 by 9 pixel submatrix may be repeated in a 18 by 18 pixel matrix or pixel map (which is a multiple of the 9 by 9 repeated pattern or submatrix).

In FIGS. 4, 5, 10, 11A, and 11B, the lens sheets were all shown and described as including linear (or elongated) lenses or lenticules that were arranged to be slanted (e.g., not orthogonal to an edge of the lens sheet). The inventors recognized that there are many applications where it is desirable to use lenses (e.g., microlenses when trying to achieve a very thin lens sheet) that are not linear or are not lenticules.

While other interlacing techniques may be used with such lenses, it was determined through analysis and experimentation that the pixel matrices or maps described above could be effectively used to provide or print interlaced images that can then be viewed through non-linear lenses (not lenticules). However, the non-linear lenses or microlenses have to be arranged in a specific pattern to provide proper viewing of the pixels in a manner similar to that achieve with slanted lenticules. Specifically, lens sheets are designed and produced in which the non-linear lenses are arranged in a plurality of side-by-side (and parallel) sets of lenses, with each set of lenses being slanted on the exterior surface of the lens sheet (or lens material).

In other words, a line passing through a center point of each lens in a lens set is at an angle relative to a side or edge of the lens sheet or lens material. This line is similar to a longitudinal axis of one of the lenticules described above, and these lines passing through different sets of lenses are parallel to each other. As with the lenticules, the slant angle would fall within a range of 10 to 46 degrees from a vertical or a horizontal axis (or side or edge) of the lens sheet. The pixel maps or matrices shown in FIGS. 6-9 may be used with these slanted sets of lenses, and, in such cases, the slant angle may be in the range of 14 to 15 degrees, in the range of 18 to 19 degrees, in the range of 26 to 27 degrees, and in the range of 44 to 46 degrees, respectively. In particular implementations of the optical product (when sets of non-linear lenses are used the product would be labeled as an optical product rather than a lenticular product), the slant angle of the lens sets is 14.04 degrees, 18.435 degrees, 26.57 degrees, or 45 degrees.

Lens sheets manufactured with slanted lens sets would be used to produce the optical products such as those shown at 1100, 1150 in FIGS. 11A and 11B with the lenticular material, lens sheet, or lens film 1110 replaced with lens sheet(s)/film(s) with slanted lens sets. Similarly, the method 1200 of manufacturing a lenticular product would be modified to produce optical products by changing step 1210 to select lens sheets or lens material with slanted sets of non-linear lenses (e.g., replace "lenticules" with slanted set of lenses). Additionally, the system 1300 of FIG. 13 can readily be modified to produce optical products 1390 by replacing the lens sheet 1384 with lenticules with one formed with slanted sets of lenses.

Figure 14:
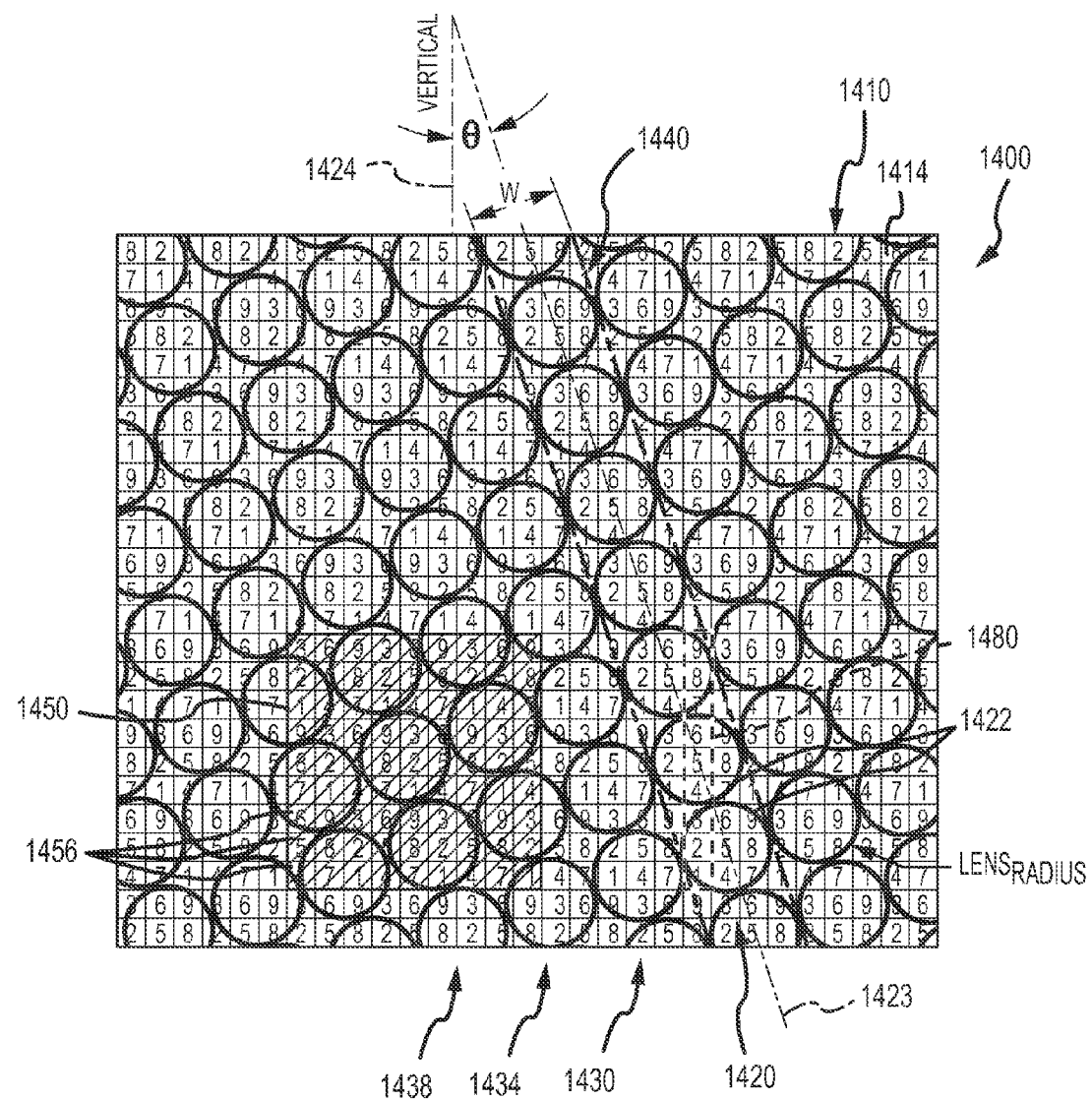
FIG. 14 illustrates an optical product with a lens sheet having lenses with round-shaped bases (or round lenses) arranged in linear sets arranged at slant angles for use with an image or ink layer printed using a pixel map or matrix of pixels (such as the pixel map of FIG. 10)

FIG. 14 illustrates, in a schematic manner, an optical product 1400 that implements these concepts. As shown, the optical product 1400 includes lens sheet or material (e.g., a transparent-to-transmissive (or translucent) film) 1410 with an upper surface 1414 that is fabricated to include a plurality of round-based, non-linear lenses or microlenses 1422 (or round lenses) in place of lenticules. The product 1400 also includes an ink layer underneath the lens sheet 1410, and the ink layer is printed using a pixel map or matrix of pixels as described for map 1000 of FIG. 10. Particularly, the pixels such as pixels 1456 are arranged in 9 by 9 matrices as shown with matrix 1450. In this way, the pixels are arranged in a pattern useful for interlacing nine frames or images to provide the 18.435 degree, non-orthogonal configuration discussed with reference to FIG. 7. In this example, nine frames are to be interlaced and printed in an ink or image layer for use with the lens sheet 1410 with slanted sets of lenses or lens sets 1420, 1430, 1434, 1438 that are angled or offset from vertical by about 18.435 degrees (i.e., $\theta$ equals 18.435 degrees in this example).

To this end, lens set 1420 is shown positioned over the ink layer formed based on the pixel map (e.g., pixel map 1000 of FIG. 10. A single lenticule or elongated lens 1440 is shown over the top of the lens set 1420. This is useful for showing that the set 1420 of round lenses 1422 can be used to replace the lenticule 1440. The longitudinal axis of the lenticule 1440 coincides with a line 1423 passing through the center or center point of each of the lenses 1422 in the lens set 1420. The line 1423 is shown to be at a slant or offset angle, $\theta$, to vertical (but this could also be horizontal) 1424 of about 18.435 degrees. In the matrix 1450, the numbered pixels or pixel locations 1456 represent locations where pixels from interlaced images/frames would be located when printing the print layer as may be performed using a print file built upon the map or matrix 1450.

Specifically, the matrix 1450 is used to interlace nine frames or images and numbers 1 through 9 are placed in each of the pixels or pixel locations 1456 in the map (e.g., each spot in the rows and columns of the map/matrix), with each like number representing a pixel from the same frame/image (e.g., all pixel locations 1456 filled with a "4" would correspond to pixels from a fourth frame/image) and at locations in such frame/image corresponding with the locations in the pixel map/matrix. For example, a "9" in the center of the map/matrix corresponds with a pixel in the ninth frame/image located in about the center of the frame/image. As another example, a "3" located in the lower left hand corner of the map/matrix corresponds with a pixel in the lower left hand corner of the third frame/image of the set of nine frames/images being combined to form an interlaced or combined print file.

As can be seen (and as discussed with regard to FIG. 10), pixels at pixel locations underneath the lenses 1422 of set 1420 (and other sets 1430, 1434, 1438) are aligned to be parallel with the line 1423 passing through the center of the lenses 1422 and are concurrently visible while the interlacing is non-orthogonal (i.e., is along a column in the map/matrix (but could be along a row if the lens set 1420 was angled from horizontal rather than vertical)). For example, a set of "9" pixels provided at the pixel locations in the map/matrix (and corresponding printed ink layer) would be visible to a viewer via the lens set 1420 from a particular point of view. In other words, following an inclination of 18.435 degrees in the map/matrix (and under the lens set 1420 having this same slant to vertical 1424) all the digits are the same within pixel locations (e.g., when used to create a print file the map/matrix calls for pixels from a single image to be aligned along an inclination of 18.435 degrees).

However, the interlacing of pixels is non-orthogonal to the lens center line 1423 as shown with the set 1480 of interlaced pixels (or pixel locations in the map/matrix and corresponding printed ink layer) that includes pixels from each frame/image. The interlacing process or algorithm may be generated based on the teaching of FIG. 7, in this example, and it is performed to align pixels of like frames/images with the center line 1423 of the lens set 1420 while providing non-orthogonal or matrix interlacing of pixels of each of the frames/images across the lenses 1422 in the lens set 1420. Note, all nine pixels in the set 1480 are not visible under a single lens 1422, with the example of FIG. 14 showing an implementation where three lenses are covering the nine interlaced pixels. In some cases, though, it may be useful to size and align the lenses 1422 in some implementations of the optical product 1400 so that each lens 1422 covers one pixel from each image or frame being interlaced. In the example of FIG. 14, each lens 1422 covers or is over a set of nine pixels associated with nine different images/frames. When the printed image is viewed through the lenses, each lens 1422 in the set is used to display a single pixel from a like image/frame (e.g., each lens 1422 displays the "5" pixels and then the "3" pixels and so on).

As discussed above, the inventors noted during the interlacing process that repeating submatrices may be identified, and these may be repeated (e.g., placed side-by-side and stacked upon each other in a repetitive manner) to generate a map or matrix as shown in FIG. 14 of a desired size and/or shape to suit a particular lens sheet. One exemplary interlacing submatrix is shown at 1450 that can be used in providing non-orthogonal interlacing of nine frames/images to suit a lens sheet with lenticules or lenses slanted to 18.435 degrees (i.e., to place pixels from each frame at inclines or angular offsets of 18.435 degrees for proper viewing through the lens sets 1420, 1430, 1434, 1438). Similar pixel maps or matrices can readily be generated for other lens sheets with different angular slants or offsets from vertical (such as for 14.04 degrees, 26.57 degrees, and 45 degrees (with ranges of about 5 or more degrees on either side of these values)).

In designing the lenses 1422 for use on the surface 1414 of the lens sheet 1410, it may be useful to arrange and size the lenses 1422 in each set 1420, 1430, 1434, 1438 to replace a slanted lenticule 1440. For example, a particular LPI may be chosen or defined as discussed herein, and this would provide a lenticule or linear lens width, W. Then, round lenses such as lenses 1422 may be chosen that have a lens radius that is about one half of this lenticule width, W. The pattern of lenses 1422 with such a radius is selected to provide sets 1420, 1430, 1434, 1438 that are each arranged in a linear pattern such that a line passes through a center point of each lens 1422 in a particular set 1420, 1430, 1434, 1438 as shown with line 1423. Further, such "center lines" of the sets 1420, 1430, 1434 and 1438 of linearly arranged lenses 1422 would all be parallel to each other. Also, as shown, there typically would be little to no space between the lenses 1422 within a set 1420, 1430, 1434, 1438 or between lenses of side-by-side sets (e.g., the lenses 1422 of sets 1420 and 1430 are shown with their bases contacting each other).

Figure 15:
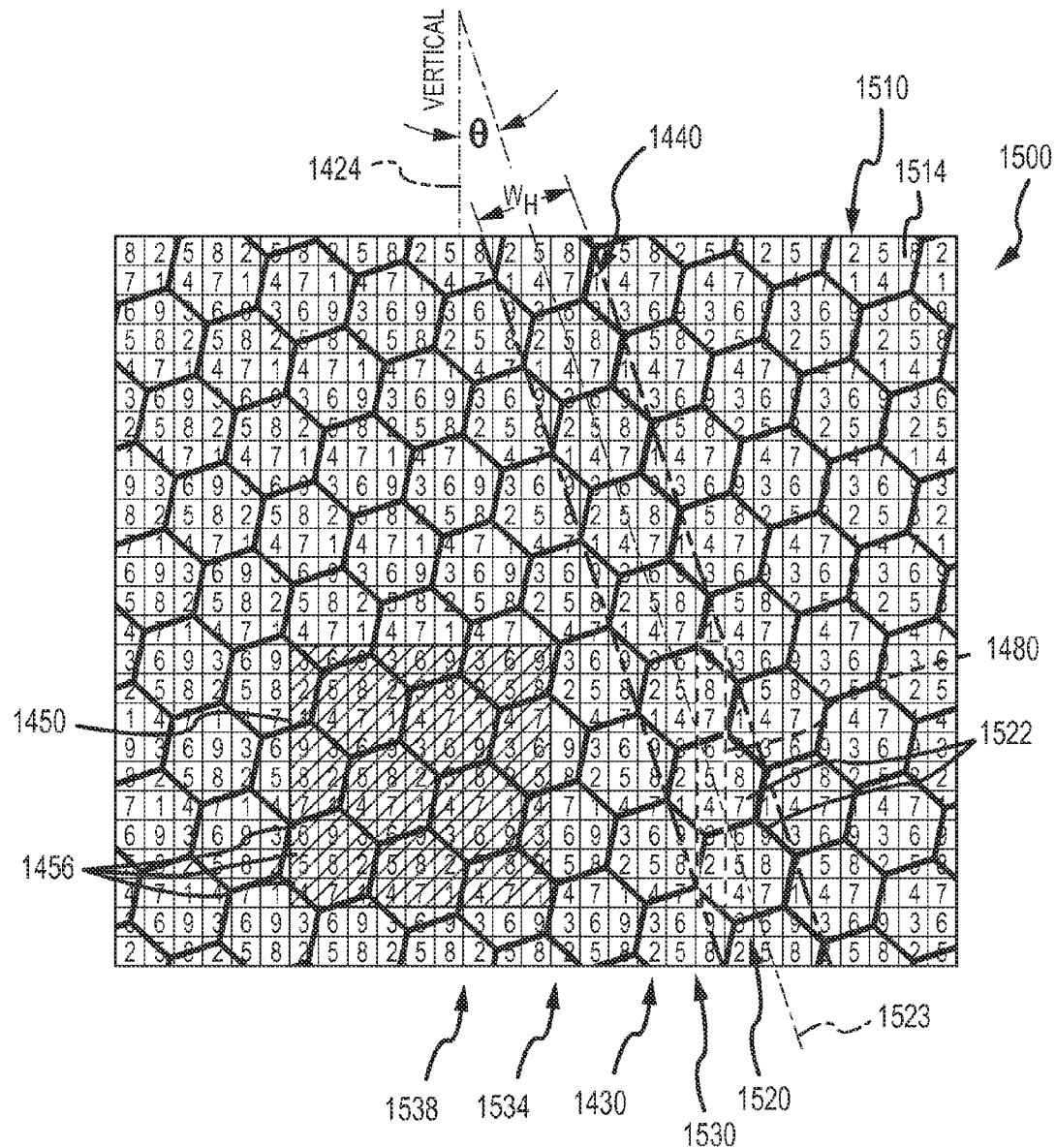
FIG. 15 illustrates an optical product, similar to that shown in FIG. 14, with a lens sheet having lenses with hexagonal-shaped bases (or hexagonal lenses)

The inventors further recognized that lenses with other base shapes may be useful in optical products (in place of the slanted lenticules). For example, FIG. 15 shows an optical product 1500 in which the lens sheet 1410 is replaced with a lens sheet 1510 with an upper surface (or surface opposite its planar bottom surface) 1514 that is fabricated with a plurality of non-linear lenses or microlenses 1522. The lenses 1522 are configured with hexagonal bases instead of round bases.

As with the lens sheet 1410, the lenses 1522 of the lens sheet 1510 are linearly arranged (or arranged in a line or row) in a pattern such that a line 1523 passes through the center of each lens 1522 in a set 1520. Further, this center line 1523 of the set 1520 is at a slant angle, θ, and not orthogonal to the edges of the sheet 1510 (or to vertical or horizontal axes of the sheet 1510). As shown, the slant angle, θ, is again 18.435 degrees (but the entire range of slant angles discussed herein may be used to produce the sheet 1510). Each set 1520, 1530, 1534, 1538 is arranged with their center lines parallel to each other. The lenses 1522 are used to replace or instead of the lenticule 1440, and, to this end, each of the lenses 1522 may have a width, $W_{Hex}$ (as measured between opposite corners of the hexagonal base) that matches the lenticule width, W. Within a set such as set 1520, the lenses 1522 may be arranged with abutting sides while adjacent sets may be nested together with as shown (e.g., with adjacent rows staggered or offset along their center lines such that an external corner of an adjacent lens is received where two lenses mate in the neighboring set).

Figure 16:
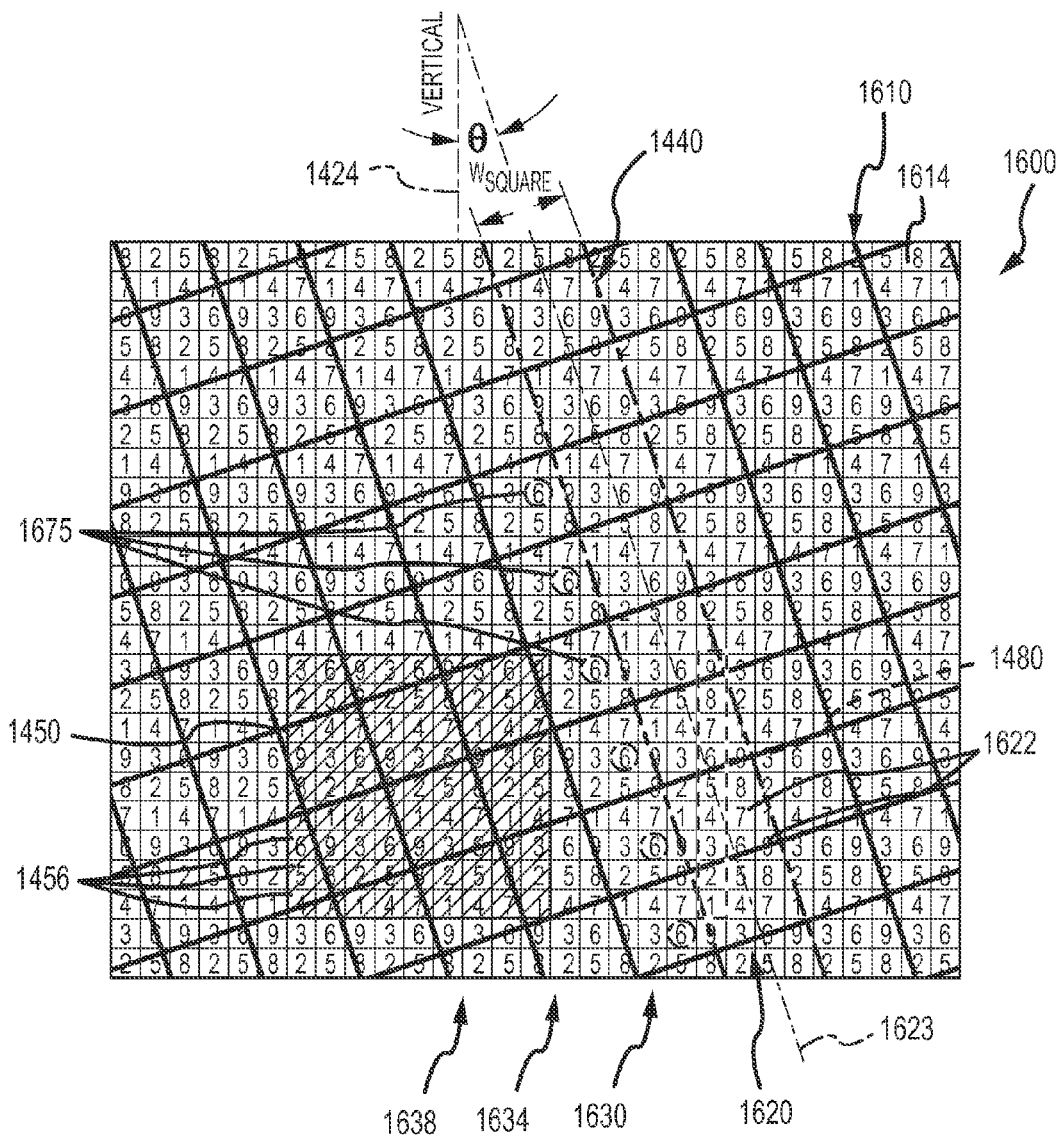
FIG. 16 illustrates an optical product, similar to that shown in FIG. 14, with a lens sheet having lenses with square-shaped bases (or square lenses).

As another lens shape example, FIG. 16 shows an optical product 1600 in which the lens sheet 1410 is replaced with a lens sheet 1610 with an upper surface (or surface opposite its planar bottom surface) 1614 that is fabricated with a plurality of non-linear lenses or microlenses 1622. The lenses 1622 are configured with square bases instead of round or hexagonal bases. As with the lens sheet 1410, the lenses 1622 of the lens sheet 1610 are linearly arranged (or arranged in a line or row) in a pattern such that a line 1623 passes through the center of each lens 1622 in a set 1620. Further, this center line 1623 of the set 1620 is at a slant angle, θ, and not orthogonal to the edges of the sheet 1610 (or to vertical or horizontal axes of the sheet 1610). As shown, the slant angle, θ, is again 18.435 degrees (but the entire range of slant angles discussed herein may be used to produce the sheet 1610).

Each set 1620, 1630, 1634, 1638 is arranged with their center lines parallel to each other. The lenses 1622 are used to replace or instead of the lenticule 1440, and, to this end, each of the lenses 1622 may have a width, $W_{Square}$ (as measured between opposite corners of the hexagonal base) that matches the lenticule width, W. Within a set such as set 1620, the lenses 1622 may be arranged or stacked with abutting sides (and two co-linear sides or edges) while being aligned (not staggered from) with the lenses of adjacent or neighboring sets as shown in the example of FIG. 16. As shown at 1675, pixels from a particular frame (here Frame 6) are visible as the lenses 1622 of set 1630 are focusing along the slant angle, θ, and this would be valid for all other frames, too.

For any type of lens (e.g., linear or lenticule, round base, hexagonal base, or square base) using the same mechanical LPI number (or lenticule width, round base diameter, hexagonal base width, or square base width), the vertical distance can be adjusted to fit the number of frames being interlaced (via slant interlacing as described herein). The adjustment is performed without changing the lens size in this case. Instead, with the same lens size, the slant angle is changed to suit the number of frames for a particular lens or lens set.

For example, the vertical distance can be increased by decreasing the magnitude of the slant angle and can be decreased by increasing the magnitude of the slant angle (e.g., more pixels can be placed in a vertical column (or horizontal row if slanting is from horizontal rather than vertical) when a slant angle of about 14 degrees is used than when a slant angle of 45 degrees is used). In other cases, scaling can be performed to adjust the "size" of the column of pixels or, in other words, the size of the matrix or map of pixels from the frames or images. In this manner, an optical product can be designed and then fabricated that has a lens sheet with different slant angles and/or with the number of frames (and associated number of pixels) adjusted to provide a desired resolution while still fitting within the vertical distance available underneath the lenticules or lenses in each lens set for interlacing a column of pixels.

We claim:

1. An optical product, comprising:
a lens sheet comprising a first side having a plurality of side-by-side sets of linearly arranged lenses with each of the sets at a slant angle from an axis of the lens sheet, wherein each of the sets of linearly arranged lenses has an axis extending through the linearly arranged lenses and a lens width as measured by a line extending orthogonal to a longitudinal axis across one of the lenses; and
an ink layer, proximate to a second side of the lens sheet opposite the first side, comprising pixels from a plurality of digital images, wherein the pixels are arranged in a pattern of pixel locations providing non-orthogonal interlacing of the digital images relative to each of the sets of the linearly arranged lenses, wherein each of the patterns of pixel locations extends along a line that is transverse and non-orthogonal to the longitudinal axis of one of the sets of linearly arranged lenses.

2. The optical product of claim 1, wherein the pattern of pixel locations is adapted to align a number of the pixels from each of the digital images to be parallel to a line extending through a center of the linearly arranged lenses in an adjacent one of the sets of the linearly arranged lenses, whereby the number of pixels is greater than a number of pixels available using interlacing orthogonal to the line extending though the center of the linearly arranged lenses.

3. The optical product of claim 1, wherein each of the linearly arranged lenses has a round, hexagonal, or square base.

4. The optical product of claim 1, wherein the lens sheet has a thickness in the range of 10 to 2500 microns and the sets of the linearly arranged lenses are provided on the first side at 75 to 1500 LPI.

5. The optical product of claim 4, wherein each of the linearly arranged lenses has a size parameter matching an LPI of the sets of the linearly arranged lenses.

6. The optical product of claim 1, wherein the plurality of digital images comprises a number of images selected from the range of 5 images to 16 images and wherein the non-orthogonal interlacing is provided by sets of the pixels equal in number to the number of images including at least one pixel from each of the plurality of digital images.

7. The optical product of claim 6, wherein the sets of the pixels providing the non-orthogonal interlacing are aligned in a row or in a column of the pattern of pixel locations.

8. The optical product of claim 6, wherein the pattern of pixel locations comprises a pixel matrix repeating submatrices of the sets of the pixels a number of times.

9. The optical product of claim 1, wherein the slant angle falls within a range of 14 to 15 degrees, a range of 18 to 19 degrees, a range of 26 to 27 degrees, or a range of 44 to 46.

10. The optical product of claim 9, wherein the slant angle is 14.04 degrees, 18.435 degrees, 26.57 degrees, or 45 degrees.

11. The optical product of claim 1, wherein the slant angle is in the range of 10 to 46 degrees and wherein each of the patterns of pixel locations is linear.

12. The optical product of claim 1, wherein the line has a length that is greater than the lens width.

13. An assembly, comprising:
a lens film comprising a plurality of side-by-side sets of linearly arranged lenses with each of the sets at a slant angle; and
an ink layer, opposite the sets of the linearly arranged lenses, comprising pixels from a plurality of images, wherein each of the sets of linearly arranged lenses has a lens width as measured by a line extending orthogonal to a longitudinal axis across one of the lenses,
wherein the pixels are arranged in a pattern of pixel locations providing non-orthogonal interlacing of the images relative to the sets of the linearly arranged lenses,
wherein pattern of pixel locations provides sets of the pixels that each extends linearly across one of the sets of linearly arranged lenses along a line having a length greater than a width of each of the sets of the linearly arranged lenses, and
wherein the pattern of pixel locations is adapted to align a number of the pixels from each of the digital images to be parallel to a line extending through a center of the linearly arranged lenses in an adjacent one of the sets of the linearly arranged lenses.

14. The assembly of claim 13, wherein each of the linearly arranged lenses has a round base, a hexagonal base, or a square base.

15. The assembly of claim 13, wherein the lens film has a thickness in the range of 10 to 2500 microns and the sets of the linearly arranged lenses are provided on the first side at 75 to 1500 LPI and wherein each of the linearly arranged lenses has a size parameter matching an LPI of the sets of the linearly arranged lenses.

16. The assembly of claim 13, wherein the plurality of digital images comprises a number of images selected from the range of 5 images to 16 images and wherein the non-orthogonal interlacing is provided by sets of the pixels equal in number to the number of images including at least one pixel from each of the plurality of digital images.

17. The assembly of claim 13, wherein the slant angle is 14.04 degrees, 18.435 degrees, 26.57 degrees, or 45 degrees.

18. The assembly of claim 13, wherein the slant angle is within a range of 14 to 15 degrees, a range of 18 to 19 degrees, a range of 26 to 27 degrees, or a range of 44 to 46 degrees.

19. An optical product, comprising:
a lens sheet comprising a first side having a plurality of side-by-side sets of linearly arranged lenses with each of the sets at a slant angle in the range of 10 to 46 degrees from an axis of the lens sheet, wherein each of the sets of linearly arranged lenses has an axis extending through the linearly arranged lenses and a lens width as measured by a line extending orthogonal to a longitudinal axis across one of the lenses; and
an ink layer, proximate to a second side of the lens sheet opposite the first side, comprising pixels from a plurality of digital images,
wherein the pixels are arranged in a plurality of patterns of pixel locations with each of the patterns of pixel locations extending along a line that is transverse and non-orthogonal to the longitudinal axis of one of the sets of linearly arranged lenses, and wherein the length of the line is at least double the lens width.

20. The optical product of claim 19, wherein the length of the line is at least triple the lens width.

21. The optical product of claim 19, wherein a step ratio, defining an increase in an amount of interlaced data when compared with traditional interlacing, is provided by the optical product that is greater than 4 when the slant angle is in the range of 14 to 15 degrees, is greater than 3 when the slant angle is in the range of 18 to 19 degrees, and is greater than 2 when the slant angle is in the range of 26 to 27 degrees.

22. The optical product of claim 19, wherein each of the linearly arranged lenses has a round, hexagonal, or square base.

23. The optical product of claim 19, wherein the plurality of digital images comprises a number of images selected from the range of 5 images to 16 images, wherein the non-orthogonal interlacing is provided by sets of the pixels equal in number to the number of images including at least one pixel from each of the plurality of digital images, and wherein the pattern of pixel locations comprises a pixel matrix repeating submatrices of the sets of the pixels a number of times.

24. The optical product of claim 19, wherein each of the linearly arranged lenses has a round base.

* * * * *